(12) United States Patent
Ooi et al.

(10) Patent No.: US 11,895,734 B2
(45) Date of Patent: Feb. 6, 2024

(54) SYSTEM AND METHOD FOR CONVERGED INCIDENT MANAGEMENT WORKFLOWS BETWEEN PRIVATE AND PUBLIC SAFETY

(71) Applicant: MOTOROLA SOLUTIONS, INC., Chicago, IL (US)

(72) Inventors: Chun Wen Ooi, Georgetown (MY); Wooi Ping Teoh, Georgetown (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 139 days.

(21) Appl. No.: 17/643,427

(22) Filed: Dec. 9, 2021

(65) Prior Publication Data
US 2023/0189396 A1   Jun. 15, 2023

(51) Int. Cl.
*H04W 76/50*   (2018.01)
*G08B 25/01*   (2006.01)
*H04W 4/90*   (2018.01)
*G06Q 50/26*   (2012.01)

(52) U.S. Cl.
CPC .......... *H04W 76/50* (2018.02); *G08B 25/016* (2013.01); *H04W 4/90* (2018.02); *G06Q 50/26* (2013.01)

(58) Field of Classification Search
CPC ...... H04W 76/50; H04W 4/90; G08B 25/016; G08B 27/001; G06Q 10/103; H04L 67/53; H04L 67/12
See application file for complete search history.

(56) References Cited

U.S. PATENT DOCUMENTS

| 9,715,675 B2 | 7/2017 | Chakravarty et al. |
| 10,423,309 B2 | 9/2019 | Kitchen et al. |
| 10,741,054 B1* | 8/2020 | Osman .................. H04W 4/12 |
| 10,867,460 B1 | 12/2020 | Miller et al. |
| 2005/0085257 A1* | 4/2005 | Laird .................. H04W 4/029 455/404.1 |
| 2009/0284348 A1* | 11/2009 | Pfeffer ................ G08B 25/006 340/7.3 |
| 2013/0046701 A1 | 2/2013 | Palmeri |
| 2013/0173062 A1 | 7/2013 | Koenig-Richarson |
| 2014/0282934 A1 | 9/2014 | Miasnik et al. |

(Continued)

OTHER PUBLICATIONS

The International Search Report and the Written Opinion, corresponding patent application No. PCT/US2022/051207 filed: Nov. 29, 2022, dated Feb. 8, 2023, all pages.

*Primary Examiner* — Minjung Kim

(57) ABSTRACT

Techniques for converged incident management workflows between private and public safety are provided. A workflow server connected to a network and associated with an enterprise detects that a workflow has been initiated. The workflow includes an action to request a public safety response. A workflow identifier for the workflow that has been initiated is sent to a public safety network. Information associated with the workflow that has been initiated is sent to the public safety network. An indication of capabilities of the public safety response is received. The workflow server creates at least one of a trigger node and an action node associated with the indication of capabilities of the public safety response. At least one existing workflow within the workflow server is modified to include the at least one of the trigger node an action node associated with the indication of capabilities of the public safety response.

20 Claims, 17 Drawing Sheets

(56) References Cited

U.S. PATENT DOCUMENTS

| | | |
|---|---|---|
| 2017/0316354 A1 | 11/2017 | Rahul et al. |
| 2020/0111041 A1 | 4/2020 | Levine et al. |
| 2021/0074099 A1 | 3/2021 | Caroselli et al. |
| 2021/0092577 A1 | 3/2021 | Niemiec et al. |
| 2021/0289334 A1* | 9/2021 | Martin .................... H04W 4/38 |
| 2023/0114663 A1* | 4/2023 | Pellegrini ........... G06F 21/6245 455/404.2 |

* cited by examiner

102

SYSTEM AND METHOD FOR CONVERGED INCIDENT MANAGEMENT WORKFLOWS BETWEEN PRIVATE AND PUBLIC SAFETY

BACKGROUND

Managing multiple devices within a security ecosystem can be a time-consuming and challenging task. This task typically requires an in-depth knowledge of each type of device within the security ecosystem in order to produce a desired workflow when a security event is detected. For example, consider a school system that employs a security ecosystem comprising a radio communication system, a video security system, and a door access control system. Assume that an administrator wishes to implement a first workflow that notifies particular radios if a door breach is detected. Assume that the administrator also wishes to implement a second workflow that also notifies the particular radios when a security camera detects loitering. In order to implement these two workflows, the access control system will have to be configured to provide the notifications to the radios and the video security system will have to be configured to provide the notifications to the radios. Thus, both the access control system and the video security system will need to be configured separately in order to implement the two workflows. As is evident, this requires the administrator to have an in-depth knowledge of both the video security system and the access control system. Thus, the lack of continuity across systems is a burden to administrators since an in-depth knowledge of all systems within the ecosystem will be needed in order to properly configure workflows within the ecosystem.

In order to reduce the burden on administrators and enhance their efficiency, a need exists for a user-friendly interface tool that gives administrators the ability to configure and automate workflows that control their integrated security ecosystem. It would also be beneficial if such a tool equips administrators with the capabilities they need to detect triggers across a number of installed devices/systems and quickly take actions (execute workflows) to reduce the risk of breaches and downtime by automatically alerting the appropriate teams and executing the proper procedures.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1A:
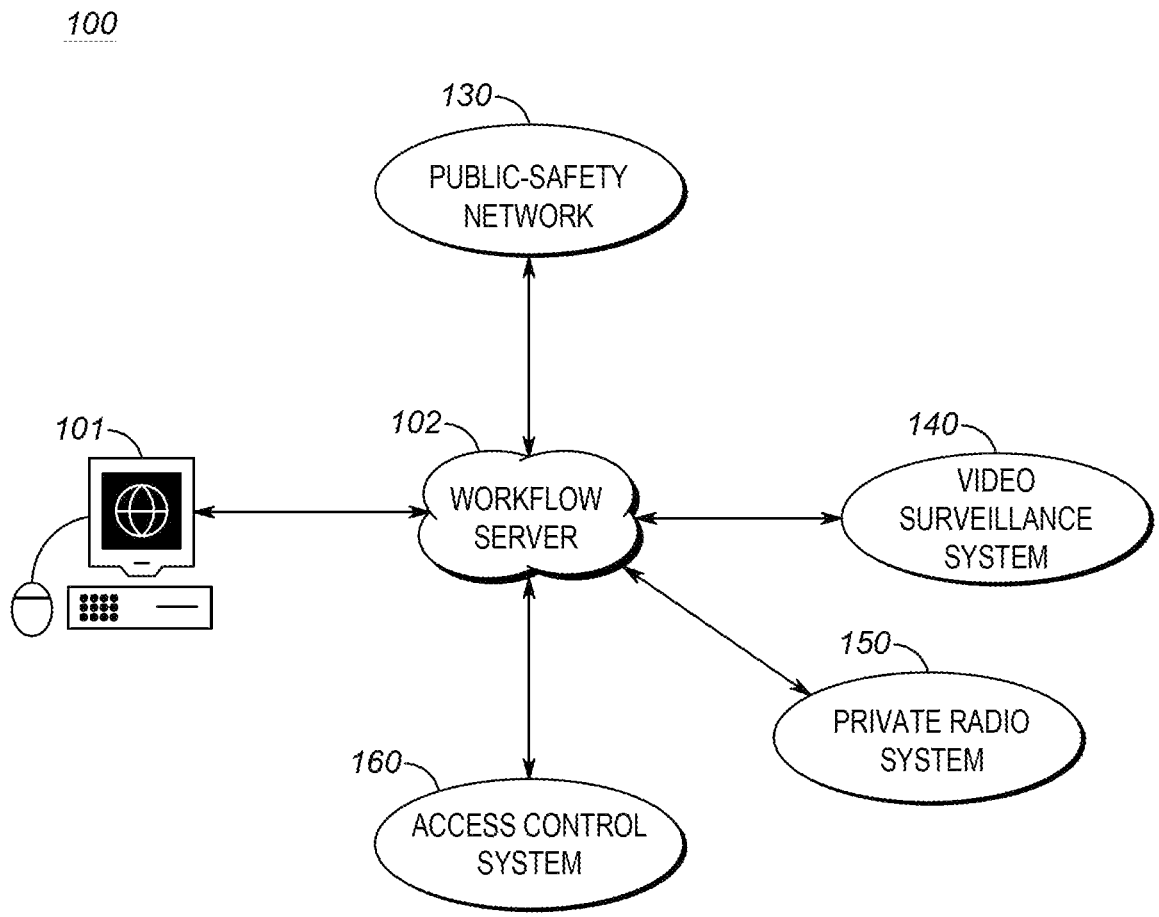
FIG. 1a illustrates a security ecosystem capable of configuring and automating workflows.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a system, method, and apparatus for implementing workflows across multiple differing systems and devices is provided herein. A workflow server is provided that allows a system administrator to abstract the configuration of each system. For example, the two situations described above (e.g. door breach, loitering) are each represented in the workflow server as a trigger. There is no need to initially define or integrate what happens when either of those triggers is received. Instead, the workflow server can be notified when either of those triggers occurs. Typically, triggers are received from some sort of sensor connected to the workflow server (e.g. door open sensor, video analytics to detect loitering, etc.).

Likewise, the outputs (e.g. notify radios) can be represented in the workflow server as actions. The actions can be any type of output from the system (e.g. notify radios, lock doors, open door, sound fire alarm, etc.). Actions are defined independent of triggers and triggers are defined independent of actions. When configuring the system, the administrator may simply drag an action item into the workspace. The administrator may then drag an action into the workspace. The two items can then be connected (e.g. using a graphical user interface to draw a line between the trigger and the action in the workspace, etc.). It should be noted that the system responsible for the trigger (e.g. access control system sensing door open, etc.) and the system responsible for initiating the action (e.g. radio system for notification) need not be configured to communicate with each other. Instead, a trigger is received by a workflow server and based on the defined workflow the workflow server initiates the action. In other words, the workflow allows each system to operate with other systems, without each system having to be specifically configured to operate with the other systems. FIGS. 1-6 describe a workflow server security ecosystem system that may be utilized with the techniques described herein.

A problem arises in that as workflows are initiated, the actions that are executed may initiate interaction with entities that are not directly under the control of the enterprise system. For example, in the case of an enterprise campus, some triggers may cause an action that says to notify a public safety system (e.g. notify 911 of an emergency, etc.). There may then be a public safety response (e.g. police dispatched, fire department deployed, etc.) by first responders. The first responders may have capabilities that the enterprise system is not initially aware of and thus could not be integrated into the workflows prior to the workflow being triggered. In other words, since the enterprise system may not be aware of which triggers/actions are available to public safety responders, those triggers/actions cannot be integrated into the workflow. In some cases, public safety responders may have capabilities that are superior to the enterprise (e.g. police officer is better equipped to deal with an armed criminal vs a unarmed security guard). In other cases, the enterprise may have capabilities that are superior to public safety (e.g. enterprise surveillance cameras likely have a better overall view of the enterprise location than a body worn camera worn by a police officer).

In addition, problems may arise because when a first responder arrives on scene, it may be difficult to protect certain concerns of the enterprise. For example, the enterprise may be concerned with privacy (e.g. a hotel protecting guest privacy, a business protecting business interests, etc.). In normal operation, the enterprise may protect these interests by simply denying access to the enterprise by those deemed to be a privacy risk. However, in the case of a first responder, responding to an incident may be of paramount importance. For example, protecting privacy interests by denying access to a firefighter responding to a fire would make little sense, as the need to fight an active fire will almost always outweigh the need for privacy protection. With that being said, the interests of the enterprise may be to allow access to only the areas related to the incident being responded to. For example, in a hotel, if there is a guest suffering a medical emergency in the lobby, it is unlikely that the first responders would need to be able to access other areas of the hotel.

As yet another problem, the lack of collaboration between the first responders and the enterprise may lead to a failure to protect premise interests. For example, a police officer may be pursuing a suspect who has locked himself into a room protected by an access control system (e.g. hotel room with keycard access, etc.). Without collaboration, the police officer may decide to break down the door, thus damaging the property of the enterprise.

The techniques described herein solve these problems individually and collectively. When an action is executed that initiates an external response, information related to the action, such as a workflow identification and details of the action, are sent to the external entity. For example, in the case of an enterprise requesting a public safety response due to a workflow that requests a public safety response, the workflow ID and details of the incident may be sent to a public safety Computer Aided Dispatch (CAD) system. Details of the workflow may include information that the public safety responders need to address the incident. For example, in the case of a criminal suspect at the enterprise location, a picture of the criminal suspect may be sent. In the case of a fire, the location of the fire may be a detail sent to the CAD system. In other words, information that may be useful to first responders when responding to the incident may be sent to the CAD system.

The CAD system may in turn provide an identifier associated with the public safety response. For example, an incident identifier may be used by the CAD system to keep track of what resources are being dispatched to handle the incident. In addition, the CAD system may respond with the capabilities of the responders that are being dispatched to respond to the incident. For example, if the first responders are equipped with a surveillance drone and other such cameras, an indication of such may be provided to the enterprise system. If the first responders are equipped with their own radio communications systems, such an indication can be provided to the enterprise system.

The enterprise system may then integrate the capabilities into the existing workflows. For example, different actions may be taken when a trigger comes from a public safety responder vs a non-public safety responder. As another example, capabilities of the public safety responders that are not normally available to the enterprise system may be integrated into the existing workflows.

A method is provided. The method includes detecting, at a workflow server connected to a network and associated with an enterprise, that a workflow has been initiated, the workflow including an action to request a public safety response. The method also includes sending, to a public-safety network, a workflow identifier for the workflow that has been initiated. The method also includes sending, to the public safety network, information associated with the workflow that has been initiated. The method also includes receiving, from the public safety network, an indication of capabilities of the public safety response, the indication of capabilities of the public safety response including a computer aided dispatch (CAD) identifier, the CAD identifier identifying the public safety response in the public safety network. The method also includes creating, by the workflow server, at least one of a trigger node and an action node associated with the indication of capabilities of the public safety response. The method also includes modifying at least one existing workflow within the workflow server to include the at least one of the trigger node and the action node associated with the indication of capabilities of the public safety response.

In one aspect, the method includes modifying at least one previously existing action of the at least one existing workflow to include the public safety response identified by the CAD identifier. In one aspect, the method includes modifying at least one previously existing trigger of the at least one existing workflow to include the public safety response identified by the CAD identifier. In one aspect, the at least one of the trigger node and the action node associated with the indication of capabilities of the public safety response includes the information sent to the public safety network.

In one aspect of the method the information sent to the public safety network includes an object of interest associated with the workflow that has been initiated. In one aspect of the method the information sent to the public safety network includes enterprise information associated with the workflow that has been initiated. In one aspect of the method the at least one trigger node includes a public safety sensor. In one aspect of the method the public safety sensor is a body worn camera.

A system is provided. The system includes a processor coupled to a memory. The memory contains a set of instructions thereon that when executed by the processor cause the processor to detect, at a workflow server connected to a network and associated with an enterprise, that a workflow has been initiated, the workflow including an action to request a public safety response. The instructions further cause the processor to send, to a public-safety network, a workflow identifier for the workflow that has been initiated. The instructions further cause the processor to send, to the public safety network, information associated with the workflow that has been initiated. The instructions further cause the processor to receive, from the public safety network, an indication of capabilities of the public safety response, the indication of capabilities of the public safety response including a computer aided dispatch (CAD) identifier, the CAD identifier identifying the public safety response in the public safety network. The instructions further cause the processor to create, by the workflow server, at least one of a trigger node and an action node associated with the indication of capabilities of the public safety response. The instructions further cause the processor to modify at least one existing workflow within the workflow server to include the at least one of the trigger node and the action node associated with the indication of capabilities of the public safety response.

In one aspect the instructions further cause the processor to modify at least one previously existing action of the at least one existing workflow to include the public safety response identified by the CAD identifier. In one aspect the instructions further cause the processor to modify at least one previously existing trigger of the at least one existing workflow to include the public safety response identified by the CAD identifier. In one aspect of the system the at least one of the trigger node and the action node associated with the indication of capabilities of the public safety response includes the information sent to the public safety network.

In one aspect of the system the information sent to the public safety network includes an object of interest associated with the workflow that has been initiated. In one aspect of the system the information sent to the public safety network includes enterprise information associated with the workflow that has been initiated.

A non-transitory processor readable medium containing a set of instructions thereon is provided. The instructions on the medium that when executed by a processor cause the processor to detect, at a workflow server connected to a network and associated with an enterprise, that a workflow has been initiated, the workflow including an action to request a public safety response. The instructions on the medium further cause the processor to send, to a public-safety network, a workflow identifier for the workflow that has been initiated. The instructions on the medium further cause the processor to send, to the public safety network, information associated with the workflow that has been initiated. The instructions on the medium further cause the processor to receive, from the public safety network, an indication of capabilities of the public safety response, the indication of capabilities of the public safety response including a computer aided dispatch (CAD) identifier, the CAD identifier identifying the public safety response in the public safety network. The instructions on the medium further cause the processor to create, by the workflow server, at least one of a trigger node and an action node associated with the indication of capabilities of the public safety response. The instructions on the medium further cause the processor to modify at least one existing workflow within the workflow server to include the at least one of the trigger node and the action node associated with the indication of capabilities of the public safety response.

In one aspect the instructions on the medium further cause the processor to modify at least one previously existing action of the at least one existing workflow to include the public safety response identified by the CAD identifier. In one aspect the instructions on the medium further cause the processor to modify at least one previously existing trigger of the at least one existing workflow to include the public safety response identified by the CAD identifier. In one aspect, the at least one of the trigger node and the action node associated with the indication of capabilities of the public safety response includes the information sent to the public safety network.

In one aspect, the information sent to the public safety network includes an object of interest associated with the workflow that has been initiated. In one aspect, the information sent to the public safety network includes enterprise information associated with the workflow that has been initiated.

Turning now to the drawings, wherein like numerals designate like components, FIG. 1a illustrates security ecosystem 100 capable of configuring and automating workflows across multiple systems. As shown, security ecosystem 100 comprises public-safety network 130, video surveillance system 140, private radio system 150, and access control system 160. Workflow server 102 is coupled to each system 130, 140, 150, and 160. Workstation 101 is shown coupled to workflow server 102, and is utilized to configure server 102 with workflows created by a user. It should be noted that although the components in FIG. 1 are shown geographically separated, these components can exist within a same geographic area, such as, but not limited to a school, a hospital, an airport, a sporting event, a stadium, . . . , etc. It should also be noted that although only networks and systems 130-160 are shown in FIG. 1a, one of ordinary skill in the art will recognize that many more networks and systems may be included in ecosystem 100.

Workstation 101 is preferably a computer configured to execute Motorola Solution's Orchestrate™ and Ally™ dispatch and incident management software. As will be discussed in more detail below, workstation 101 is configured to present a user with a plurality of triggers capable of being detected by network and systems 130-160 as well as present the user with a plurality of actions capable of being executed by network and systems 130-160. The user will be able to create workflows and upload these workflows to workflow server 102 based on the presented triggers and actions.

Workflow server 102 is preferably a server running Motorola Solution's Command Central™ software suite comprising the Orchestrate™ platform. Workflow server 102 is configured to receive workflows created by workstation 101 and implement the workflows. Particularly, the workflows are implemented by analyzing events detected by network and systems 130-160 and executing appropriate triggers. For example, assume a user creates a workflow on workstation 101 that has a trigger comprising surveillance system 140 detecting a loitering event, and has an action comprising notifying radios within public-safety network 130. When this workflow is uploaded to workflow server 102, workflow server 102 will notify the radios of any loitering event detected by surveillance system 140.

Public-safety network 130 is configured to detect various triggers and report the detected triggers to workflow server 102. Public-safety network 130 is also configured to receive action commands from workflow server 102 and execute the actions. In one embodiment of the present invention, public-safety network 130 comprises includes typical radio-access network (RAN) elements such as base stations, base station controllers (BSCs), routers, switches, and the like, arranged, connected, and programmed to provide wireless service to user equipment, report detected events, and execute actions received from workflow server 102.

Video surveillance system 140 is configured to detect various triggers and report the detected triggers to workflow server 102. Public-safety network 130 is also configured to receive action commands from workflow server 102 and execute the actions. In one embodiment of the present invention, video surveillance system 140 comprises a plurality of video cameras that may be configured to automatically change their field of views over time. Video surveillance system 140 is configured with a recognition engine/video analysis engine (VAE) that comprises a software engine that analyzes any video captured by the cameras. Using the VAE, the video surveillance system 140 is capable of "watching" video to detect any triggers and report the detected triggers to workflow server 102. In a similar manner, video surveillance system 140 is configured to execute action commands received from workflow server 102. In one embodiment of the present invention, video surveillance system 140 comprises an Avigilon™ Control Center (ACC) server having Motorola Solution's Access Control Management (ACM)™ software suite.

Radio system 150 preferably comprises a private enterprise radio system that is configured to detect various triggers and report the detected triggers to workflow server 102. Radio system 150 is also configured to receive action commands from workflow server 102 and execute the actions. In one embodiment of the present invention, radio system 150 comprises a MOTOTRBO™ communication system having radio devices that operate in the CBRS spectrum and combines broadband data with voice communications.

Finally, access control system 160 comprises an IoT network. IoT system 160 serves to connect every-day devices to the Internet. Devices such as cars, kitchen appliances, medical devices, sensors, doors, windows, HVAC systems, drones, . . . , etc. can all be connected through the IoT. Basically, anything that can be powered can be connected to the internet to control its functionality. System 160 allows objects to be sensed or controlled remotely across existing network infrastructure. For example, access control system 160 may be configured to provide access control to various doors and windows. With this in mind, access control system 160 is configured to detect various triggers (e.g., door opened/closed) and report the detected triggers to workflow server 102. Access control system 160 is also configured to receive action commands from workflow server 102 and execute the action received from workflow server 102. The action commands may take the form of instructions to lock, open, and/or close a door or window.

As is evident, the above security ecosystem 100 allows an administrator using workstation 101 to create rule-based, automated workflows between technologies to enhance efficiency, and improve response times, effectiveness, and overall safety. The above ecosystem 100 has the capability to detect triggers across a number of devices within network and systems 130-160 quickly take actions by automatically executing the proper procedure (i.e., executing the appropriate action once a trigger is detected).

Figure 1B:
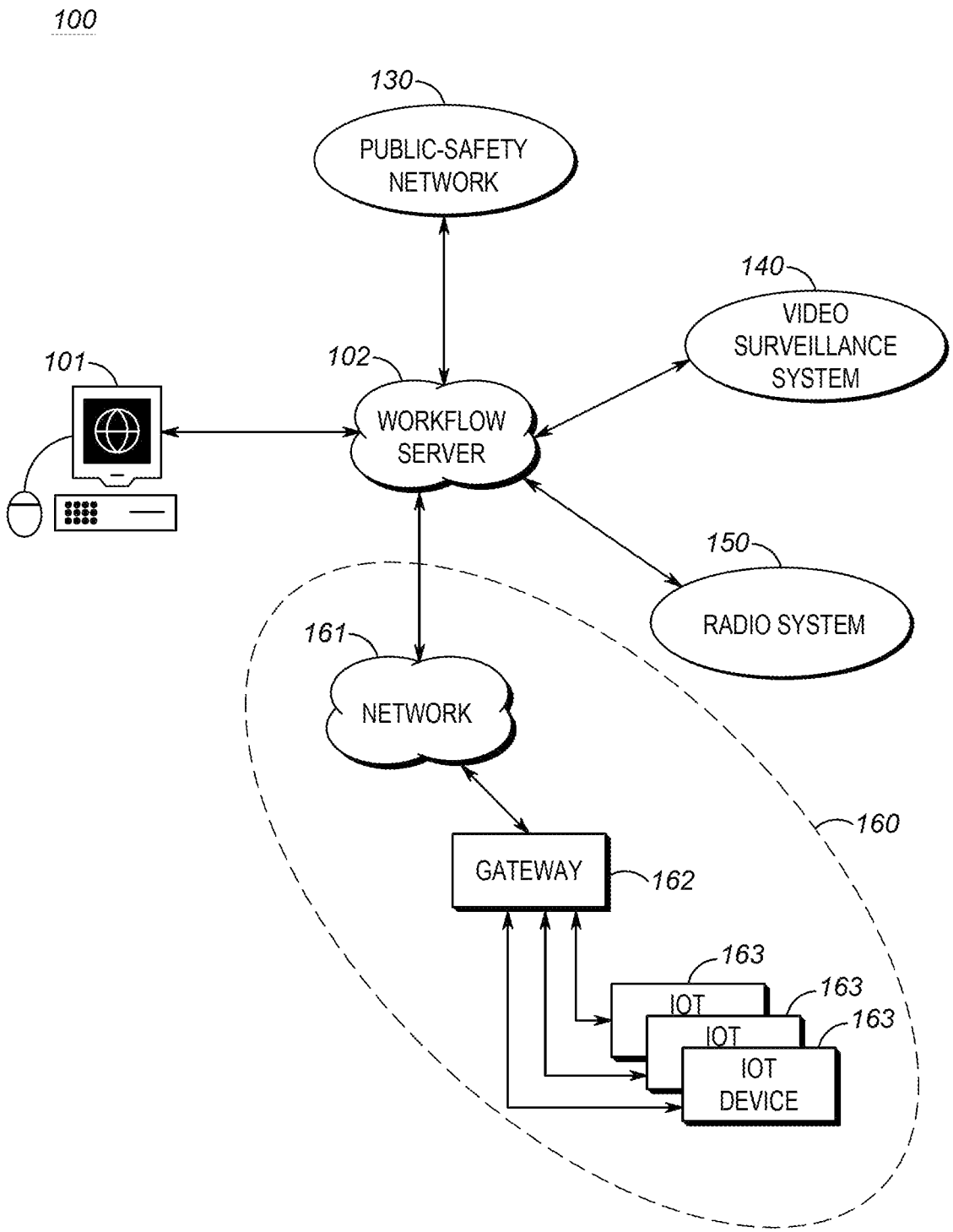
FIG. 1b illustrates a security ecosystem capable of configuring and automating workflows.

FIG. 1B illustrates a security ecosystem capable of configuring and automating workflows. In particular, FIG. 1B shows security ecosystem 100 with an expanded view of access control system 160. As shown, access control system 160 comprises a plurality of IoT devices 163 coupled to gateway 162. Data passed from workflow server 102 to IoT devices 163 passes through network 161, gateway 162 and ultimately to IoT device 163. Conversely, data passed from IoT devices 163 to workflow server 102 passes through gateway 162, network 161, and ultimately to workflow server 102.

IoT devices 163 preferably comprise devices that control objects, doors, windows, sensors, . . . , etc. As is known in the art, a particular communication protocol (IoT protocol) may be used for each IoT device. For example, various proprietary protocols such as DNP, Various IEC**** protocols (IEC 61850 etc. . . . ), bacnet, EtherCat, CANOpen, Modbus/Modbus TCP, EtherNet/IP, PROFIBUS, PROFINET, DeviceNet, . . . , etc. can be used. Also a more generic protocol such as Coap, Mqtt, and RESTfull may also be used.

Gateway 162 preferably comprises an Avigilon™ Control Center running Avigilon's Access Control Management software. Gateway 162 is configured to run the necessary Application Program Interface (API) to provide communications between any IoT device 163 and workflow server 102.

Network 161 preferably comprises one of many networks used to transmit data, such as but not limited to a network employing one of the following protocols: a Long Term Evolution (LTE) protocol, LTE-Advance protocol, or 5G protocol including multimedia broadcast multicast services (MBMS) or single site point-to-multipoint (SC-PTM) protocol over which an open mobile alliance (OMA) push to talk (PTT) over cellular protocol (OMA-PoC), a voice over IP (VoIP) protocol, an LTE Direct or LTE Device to Device protocol, or a PTT over IP (PoIP) protocol, a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Figure 1C:
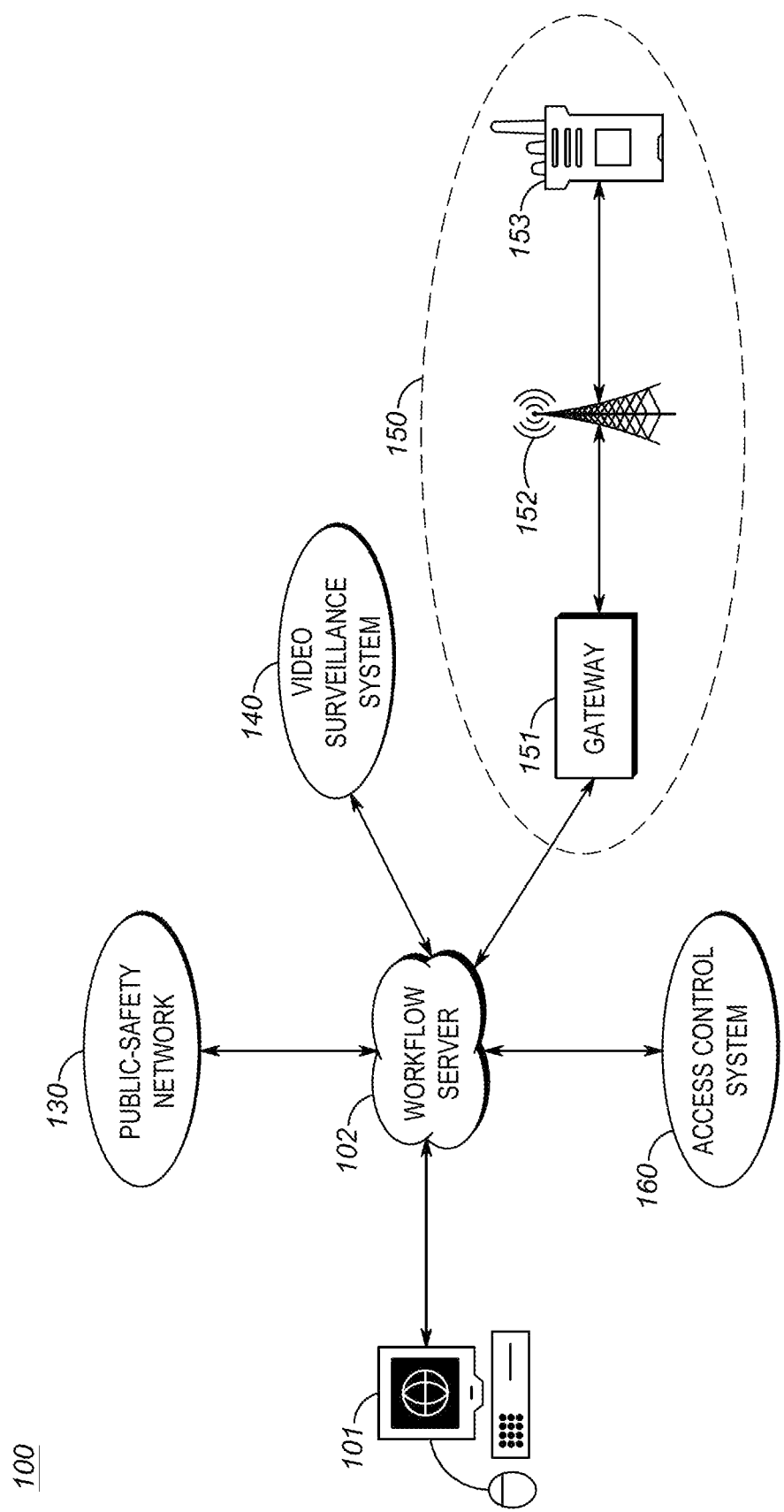
FIG. 1c illustrates a security ecosystem capable of configuring and automating workflows.

FIG. 1c illustrates a security ecosystem capable of configuring and automating workflows. In particular, FIG. 1c shows security ecosystem 100 with an expanded view of radio system 150. As shown, radio system 150 comprises gateway 151, system infrastructure 152, and at least one radio 153. Communications from radio 153 to workflow server 102 passes through infrastructure 152, gateway 151, and ultimately to workflow server 102.

Gateway 151 preferably comprises an Avigilon™ Control Center running Avigilon's Access Control Management software. Gateway 151 is configured to run the necessary Application Program Interface (API) to provide communications between any infrastructure 152 and workflow server 102.

Infrastructure 152 comprises the necessary equipment to provide wireless communications to and from radio 153. Preferably, infrastructure 152 comprises Motorola Solutions MOTOTRBO™ equipment, such as an SLR Series Repeater (e.g., SLR 1000, SLR 5000, or SLR8000 repeater) configured to provide two-way radio service to radio 153.

Although only a single radio 153 is shown in FIG. 1c, one of ordinary skill in the art will recognize that many radios 153 may be present within radio system 150. Each radio 153 preferably comprises a MOTOTRBO™ two-way radio (such as a Motorola Solution XPR 5000 Series radio) with digital technology providing integrated voice and data communication.

Figure 1D:
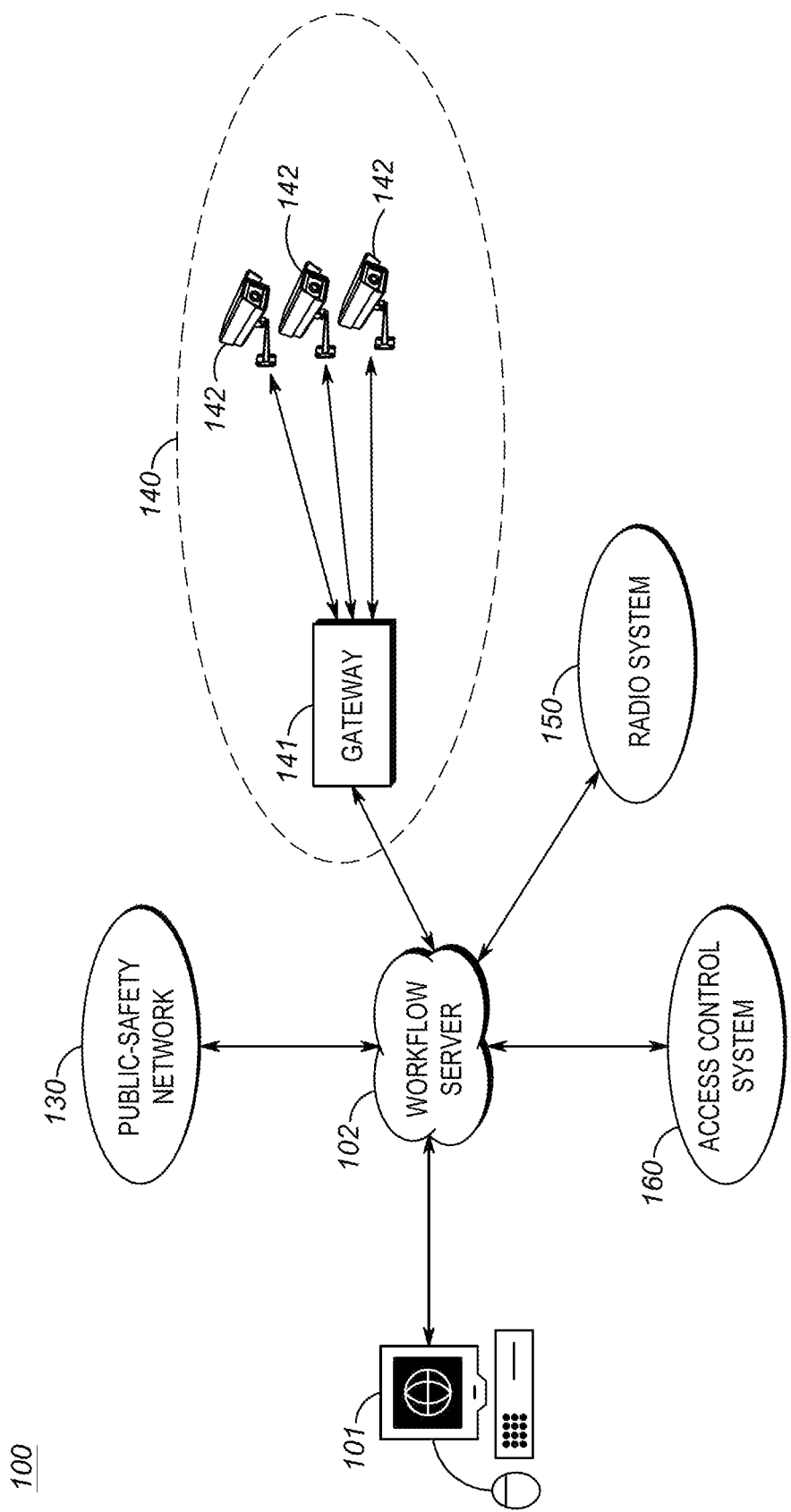
FIG. 1d illustrates a security ecosystem capable of configuring and automating workflows.

FIG. 1d illustrates a security ecosystem capable of configuring and automating workflows. In particular, FIG. 1d shows security ecosystem 100 with an expanded view of video surveillance system 140. As shown, video surveillance system 140 comprises a plurality of cameras 142 and gateway 141.

Cameras 142 may be fixed or mobile, and may have pan/tilt/zoom (PTZ) capabilities to change their field of view. Cameras 142 may also comprise circuitry configured to serve as a video analysis engine (VAE) which comprises a software engine that analyzes analog and/or digital video. The engine configured to "watch" video and detect preselected objects such as license plates, people, faces, automobiles.

The software engine may also be configured to detect certain actions of individuals, such as fighting, loitering, crimes being committed, . . . , etc. The VAE may contain any of several object/action detectors. Each object/action detector "watches" the video for a particular type of object or action. Object and action detectors can be mixed and matched depending upon what is trying to be detected. For example, an automobile object detector may be utilized to detect automobiles, while a fire detector may be utilized to detect fires.

Gateway 141 preferably comprises an Avigilon™ Control Center running Avigilon's Access Control Management software. Gateway 141 is configured to run the necessary Application Program Interface (API) to provide communications between any cameras 142 and workflow server 102.

Figure 1E:
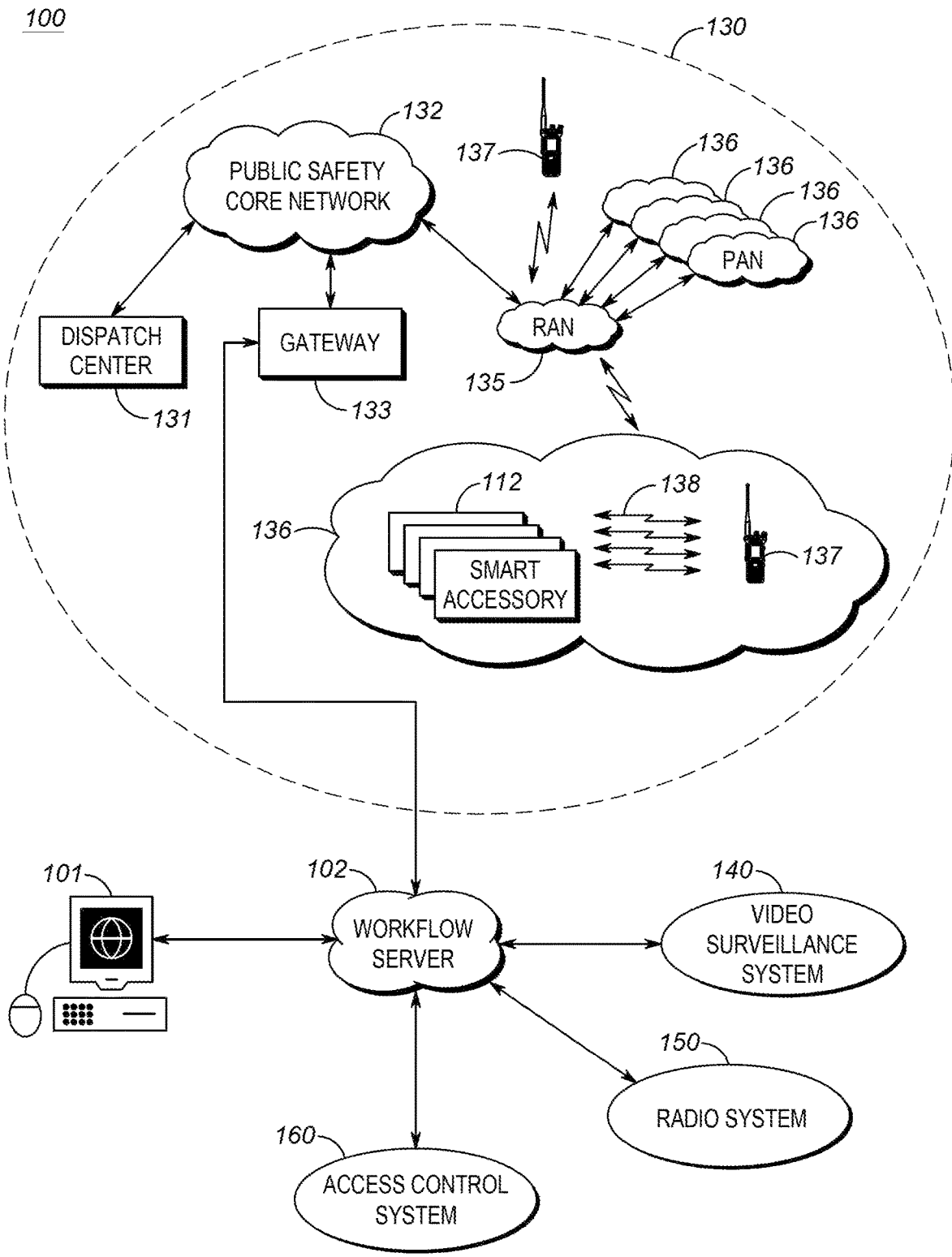
FIG. 1e illustrates a security ecosystem capable of configuring and automating workflows.

FIG. 1e illustrates a security ecosystem capable of configuring and automating workflows. In particular, FIG. 1e shows security ecosystem 100 with an expanded view of public safety network 130. As shown, public-safety network 130 comprises gateway 133, public-safety core network 132, dispatch center 131, radio access network (RAN) 135, at least one public-safety radio 137, and a plurality of personal-area networks (PANs) 136. As shown, each PAN 136 comprises radio 137 acting as a hub to smart devices/accessories 112.

Gateway 133 preferably comprises an Avigilon™ Control Center running Avigilon's Access Control Management software. Gateway 133 is configured to run the necessary Application Program Interface (API) to provide communications between public-safety core network 132 and workflow server 102.

A public safety officer (not shown in FIG. 1e) will be equipped with devices 112 that determine various physical and environmental conditions surrounding the public-safety officer. These conditions may be reported back to, for example, dispatch center 131 or workflow server 102 so an appropriate action may be taken. For example, future police officers may have a sensor 112 that determines when a gun is drawn. Upon detecting that an officer has drawn their gun, a notification may be sent back to the dispatch operator and/or workflow server 102 so that, for example, other officers in the area may be notified of the situation.

It is envisioned that the public-safety officer will have an array of these shelved devices 112 available to the officer at the beginning of a shift. The officer will select devices 112 off the shelf, and form a personal area network (PAN) with the devices that will accompany the officer on their shift. For example, the officer may pull a gun-draw sensor, a body-worn camera, a wireless microphone, a smart watch, a police radio, smart handcuffs, a man-down sensor, a bio-sensor, . . . , etc. All devices 112 pulled by the officer will be configured to form a PAN by associating (pairing) with each other and communicating wirelessly among the devices. At least one device may be configured with a digital assistant. In a preferred embodiment, the PAN comprises more than two devices, so that many devices may be connected via the PAN simultaneously.

A method called bonding is typically used for recognizing specific devices 112 and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device. Thus, as shown, public-safety communication system 130 incorporates PANs 136 created as described above. In a preferred embodiment of the present invention, radios 137 and devices 112 form PAN 136, with communication links 138 between devices 112 and radios 137 taking place utilizing a short-range communication system protocol such as a Bluetooth communication system protocol. In this particular embodiment, a pan will be associated with a single officer. Thus, FIG. 1e illustrates multiple PANs 136 associated with multiple officers (not shown).

RAN 135 includes typical RAN elements such as base stations, base station controllers (BSCs), routers, switches, and the like, arranged, connected, and programmed to provide wireless service to user equipment (e.g., radios 137, and the like) in a manner known to those of skill in the relevant art. RAN 135 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 135 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 135 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 132 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 132 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between radios 137 and other devices via wireless transmissions in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Radios 137 serves as a PAN main device, and may be any suitable computing and communication device configured to engage in wireless communication with the RAN 135 over the air interface as is known to those in the relevant art. Moreover, one or more radios 137 are further configured to engage in wired and/or wireless communication with one or more local device 112 via the communication link 138. Radios 137 will be configured to determine when to forward information received from PAN devices to, for example, a dispatch center or workflow server 102.

Some examples follow of devices 112 follow:

A sensor-enabled holster 112 may be provided that maintains and/or provides state information regarding a weapon or other item normally disposed within the user's sensor-enabled holster 112. The sensor-enabled holster 112 may detect a change in state (presence to absence) and/or an action (removal) relative to the weapon normally disposed within the sensor-enabled holster 112. The detected change in state and/or action may be reported to portable radio 137 via its short-range transceiver, which may forward the state change to dispatch center 131 or workflow server 102. In some embodiments, the sensor-enabled holster may also detect whether the first responder's hand is resting on the weapon even if it has not yet been removed from the holster and provide such information to portable radio 137.

A biometric sensor 112 (e.g., a biometric wristband) may be provided for tracking an activity of the user or a health status of a user, and may include one or more movement sensors (such as an accelerometer, magnetometer, and/or gyroscope) that may periodically or intermittently provide to the portable radio 137 indications of orientation, direction, steps, acceleration, and/or speed, and indications of health such as one or more of a captured heart rate, a captured breathing rate, and a captured body temperature of the user, perhaps accompanying other information. This information may be reported to radio 137 which may forward the information to dispatch center 131 and/or workflow server 102.

An accelerometer 112 may be provided to measures acceleration. Single and multi-axis models are available to detect magnitude and direction of the acceleration as a vector quantity, and may be used to sense orientation, acceleration, vibration shock, and falling. The accelerometer 112 may determine if an officer is running. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing. This information may be reported to radio 137 which may forward the information to dispatch center 131 and/or workflow server 102.

A heart rate sensor 112 may be provided and use electrical contacts with the skin to monitor an electrocardiography (EKG) signal of its wearer, or may use infrared light and imaging device to optically detect a pulse rate of its wearer, among other possibilities. This information may be reported to radio 137 which may forward the information to dispatch center 131 and/or workflow server 102.

A breathing rate sensor 112 may be provided to monitor breathing rate. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well. This information may be reported to radio 137 which may forward the information to dispatch center 131 and/or workflow server 102.

Dispatch center 131 comprises, or is part of, a computer-aided-dispatch center (sometimes referred to as an emergency-call center or public-safety answering point), that may be manned by an operator providing necessary dispatch operations. For example, dispatch center 131 typically comprises a graphical user interface that provides the dispatch operator necessary information about public-safety officers. As discussed above, some of this information originates from devices 112 providing information to radios 137, which forwards the information to RAN 135 and ultimately to dispatch center 131.

In a similar manner information about public-safety officers may be provided to workflow server 102. This information originates from devices 112 providing information to radios 137, which forwards the information to RAN 135 and ultimately to workflow server 102 via core network 132 and gateway 133. For example, a gun-draw sensor 112 may send an indication to workflow server 102 that a gun has been drawn. This may serve as a "trigger" for workflow server 102 to initiate a particular "action", for example, notifying surrounding officers (for example on a particular talkgroup) by having their radios 137 provide an alarm indicating the triggering event. Thus, workflow server 102 may provide instructions to any device 112 or radio 137 by sending an "action" to devices 112 in response to a trigger being received.

Figure 2:
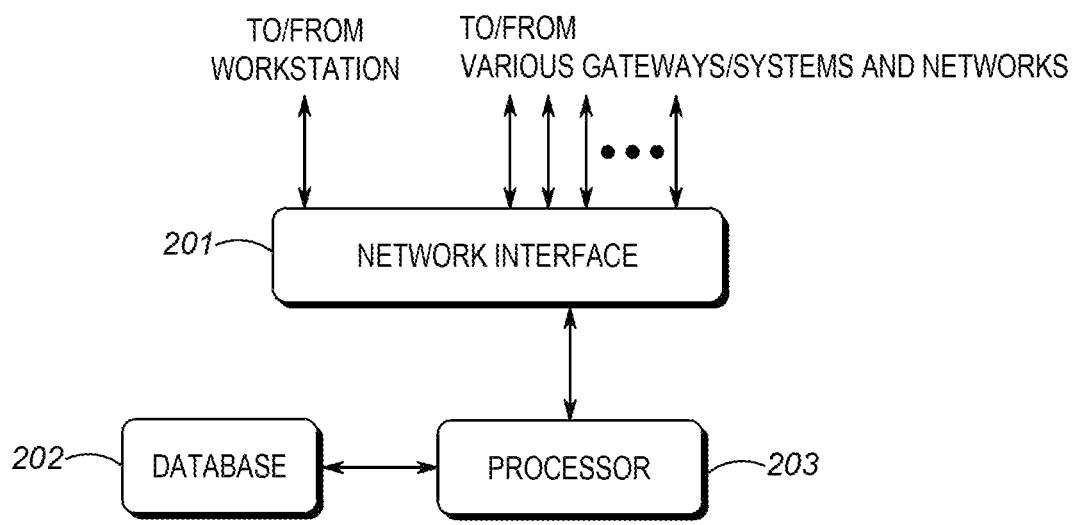
FIG. 2 is a block diagram of a workflow server of FIG. 1.

FIG. 2 is a block diagram of a workflow server of FIG. 1. As shown, workflow server 102 comprises network interface 201, database 202, and processor (serving as logic circuitry) 203.

Network interface 201 includes elements including processing, modulating, and transceiver elements that are operable in accordance with any one or more standard or proprietary wireless interfaces, wherein some of the functionality of the processing, modulating, and transceiver elements may be performed by means of processor 203 through programmed logic such as software applications or firmware stored on the storage component 202 (e.g., standard random access memory) or through hardware. Examples of network interfaces (wired or wireless) include Ethernet, T1, USB interfaces, IEEE 802.11b, IEEE 802.11g, etc.

Logic circuitry 403 comprises a digital signal processor (DSP), general purpose microprocessor, a programmable logic device, or application specific integrated circuit (ASIC) and is configured to receive triggers from various gateways, systems, and networks. Once a trigger is received, logic circuitry 203 is configured to execute (or cause to be executed) a particular action for the trigger. More particularly, when logic circuitry 203 receives a trigger from any attached network or system, logic circuitry will access database 202 to determine an action for the particular trigger. Once an action has been determined, logic circuitry will execute the action, or cause the action to be executed. In order to perform the above, logic circuitry executes an instruction set/software (e.g., Motorola Solution's Command Central™ software suite comprising the Orchestrate™ platform) stored in database 202.

Database 202 comprises standard memory (such as RAM, ROM, . . . , etc) and serves to store associations between triggers and actions. This is illustrated in Table 1, below.

TABLE 1

| Associations Between Triggers and Actions. | |
|---|---|
| Trigger | Action |
| Warehouse back door opened | Pan camera 342 to point at door |
| Man-Down sensor activated for Officer Smith | Notify dispatch center via emergency text message |
| ALPR for delivery truck | Open back gate |
| . . . etc. | . . . etc. |

Figure 3:
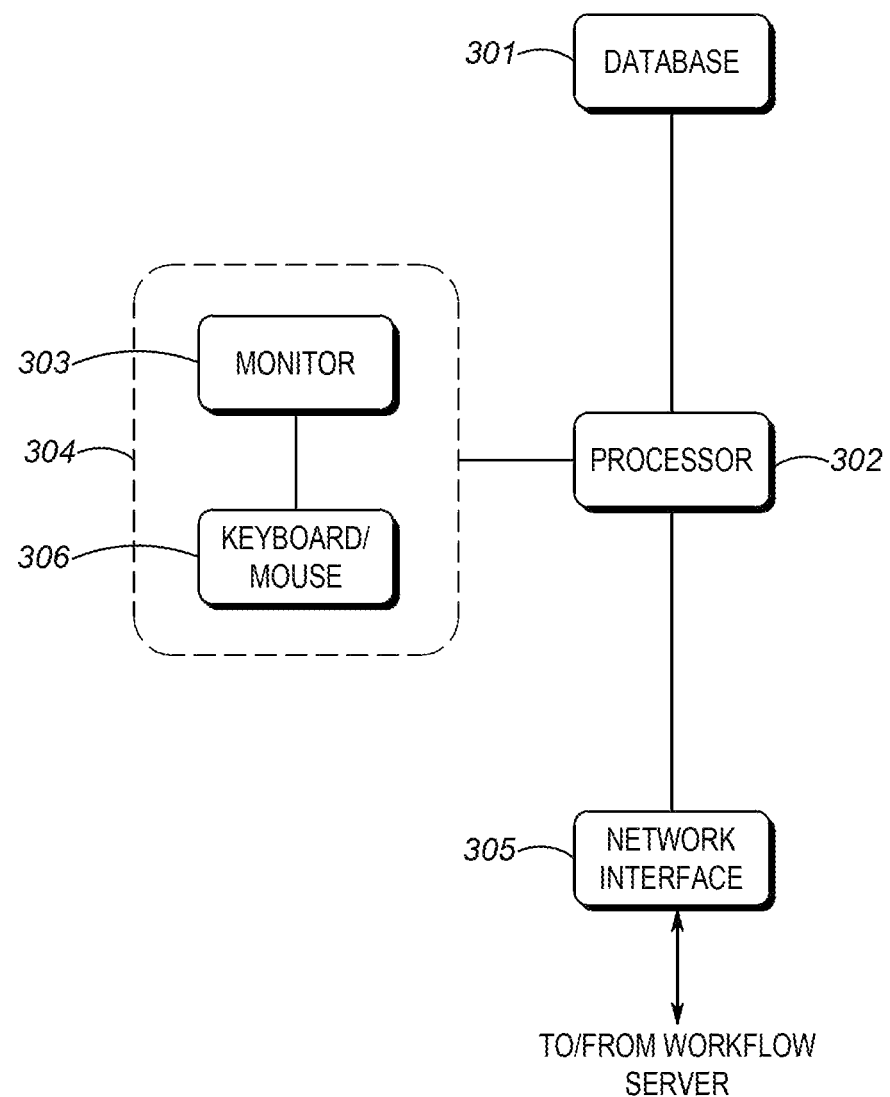
FIG. 3 is a block diagram of a workstation of FIG. 1 utilized to create a workflow.

FIG. 3 is a block diagram of a workstation of FIG. 1 utilized to create a workflow. As shown, workstation 101 comprises database 301, processor 302, graphical user interface 304, and network interface 305.

Network interface 305 includes elements including processing, modulating, and transceiver elements that are operable in accordance with any one or more standard or proprietary wireless interfaces, wherein some of the functionality of the processing, modulating, and transceiver elements may be performed by means of processor 302 through programmed logic such as software applications or firmware stored on the storage component 301 (e.g., standard random access memory) or through hardware. Examples of network interfaces (wired or wireless) include Ethernet, T1, USB interfaces, IEEE 802.11b, IEEE 802.11g, etc.

Logic circuitry 302 comprises a digital signal processor (DSP), general purpose microprocessor, a programmable logic device, or application specific integrated circuit (ASIC) and is configured to execute Motorola Solution's Orchestrate™ and Ally™ dispatch and incident management software from storage 301. The execution of such software will allow users of GUI 304 to create workflows (i.e., actions and their associated responses) by receiving user inputs from GUI 304 that define various triggers and their associated actions, which will ultimately be uploaded to workflow server 102 and stored in database 202.

Database 301 comprises standard memory (such as RAM, ROM, . . . , etc) and serves to store instructions as software. Particularly, Motorola Solution's Orchestrate™ and Ally™ dispatch and incident management software is stored in database 301.

GUI 304 provides a man/machine interface for receiving an input from a user and displaying information. For example, GUI 304 provides a way of conveying (e.g., displaying) user-created workflows. Thus, GUI 304 also provides means for a user to input workflows into a displayed form. In order to provide the above features (and additional features), GUI 304 may comprises any combination of monitor 303 (e.g., touch screen, a computer screen, . . . , etc.) and keyboard/mouse combination 306.

Figure 4:
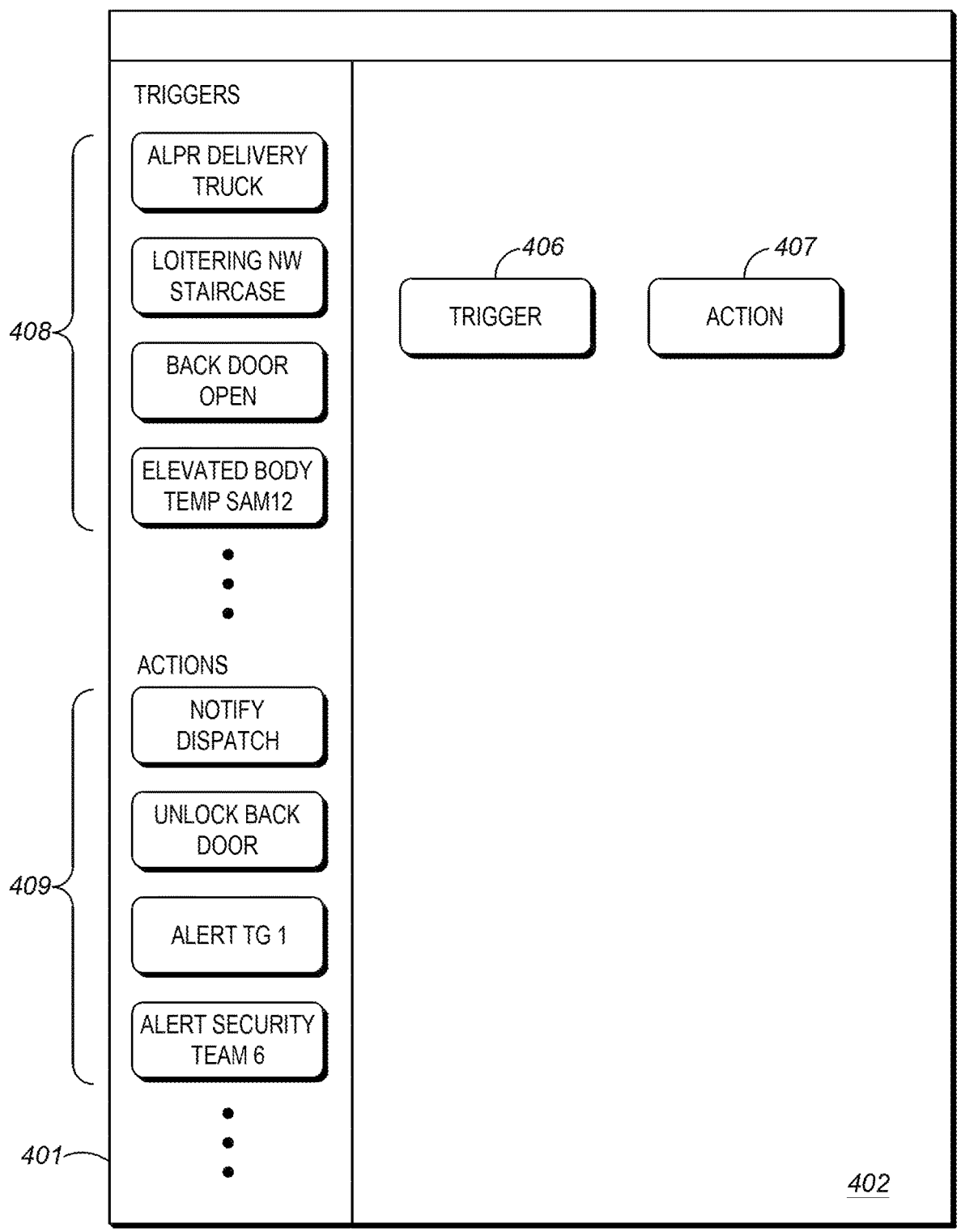
FIG. 4 illustrates the creation of a workflow.

FIG. 4 illustrates the creation of a workflow. More particularly, FIG. 4 illustrates a dashboard displayed on monitor 303 utilized for the creation of workflows.

The dashboard consists of the following main elements:
  selection pane 401 on the left-hand side, which comprises the available triggers 408 and actions 409;
  workspace 402, which comprises the large area in the middle of the dashboard used to create workflows that define the connections between products. Each workflow in the workspace is displayed as a separate field 406 and 407 with an outline and a title. As shown in FIG. 4, two fields 406 and 407 are shown, one labeled "trigger" and another labeled "action".

Triggers 408 represent the events originating from various sensors, software, and devices within security ecosystem 100. Actions 409 represent the possible responses to the triggers.

After a workflow is deployed (i.e., uploaded to workflow server 102), its actions activate when the triggers occur. Triggers and actions appear on the workspace after they are dragged and dropped from the triggers 408 and actions 409 tabs respectively. Connecting the triggers and actions on the workspace (as described below) will create a workflow.

All triggers 408 and actions 409 are stored in database 301 and represent integrations across multiple products. In other words, triggers and actions comprise triggers and actions for all of the components available in security ecosystem 100. This includes cameras, sensors, IoT devices, radios, . . . , etc. As administrators add additional technology pieces to security ecosystem 100, those pieces are automatically made available for workflow creation as discussed herein.

In order to associate a trigger with an action, a user selects a trigger from all possible triggers 406, and drags and drops it onto workspace area 402. The user then selects an action for the trigger, and drags and drops it onto workspace area 402. In order to associate the trigger with the action, they must be connected. To connect the trigger and actions, a user will click the end of one of the node, and drag a line to the other node.

Figure 5:
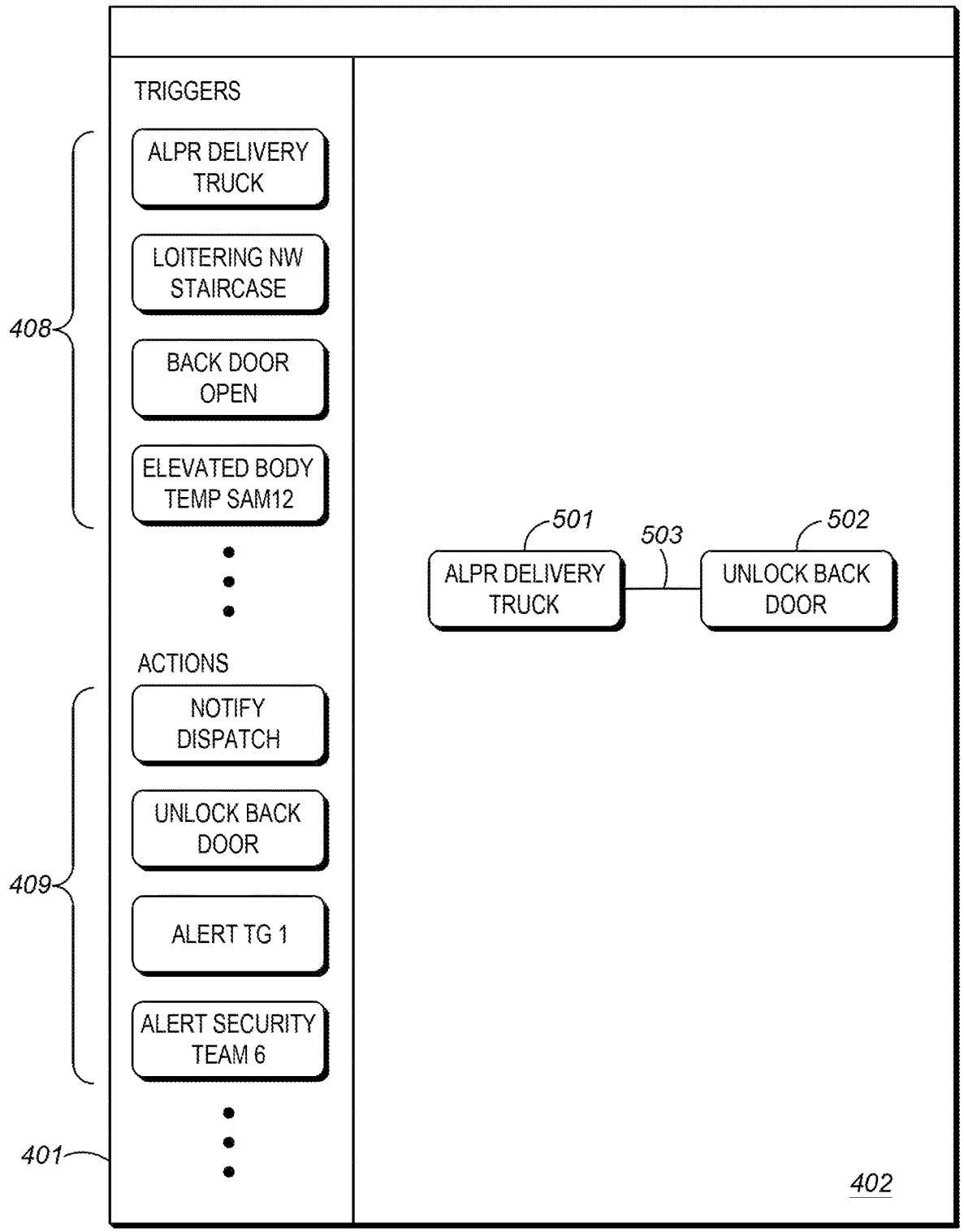
FIG. 5 illustrates the creation of a workflow.

As shown in FIG. 5, a trigger "ALPR delivery truck" 501 has been associated with an action "unlock back door" 502 by dragging line 503 between the two. If any of the triggers within a trigger group occurs, the workflow is initiated causing the action to be executed.

Figure 6:
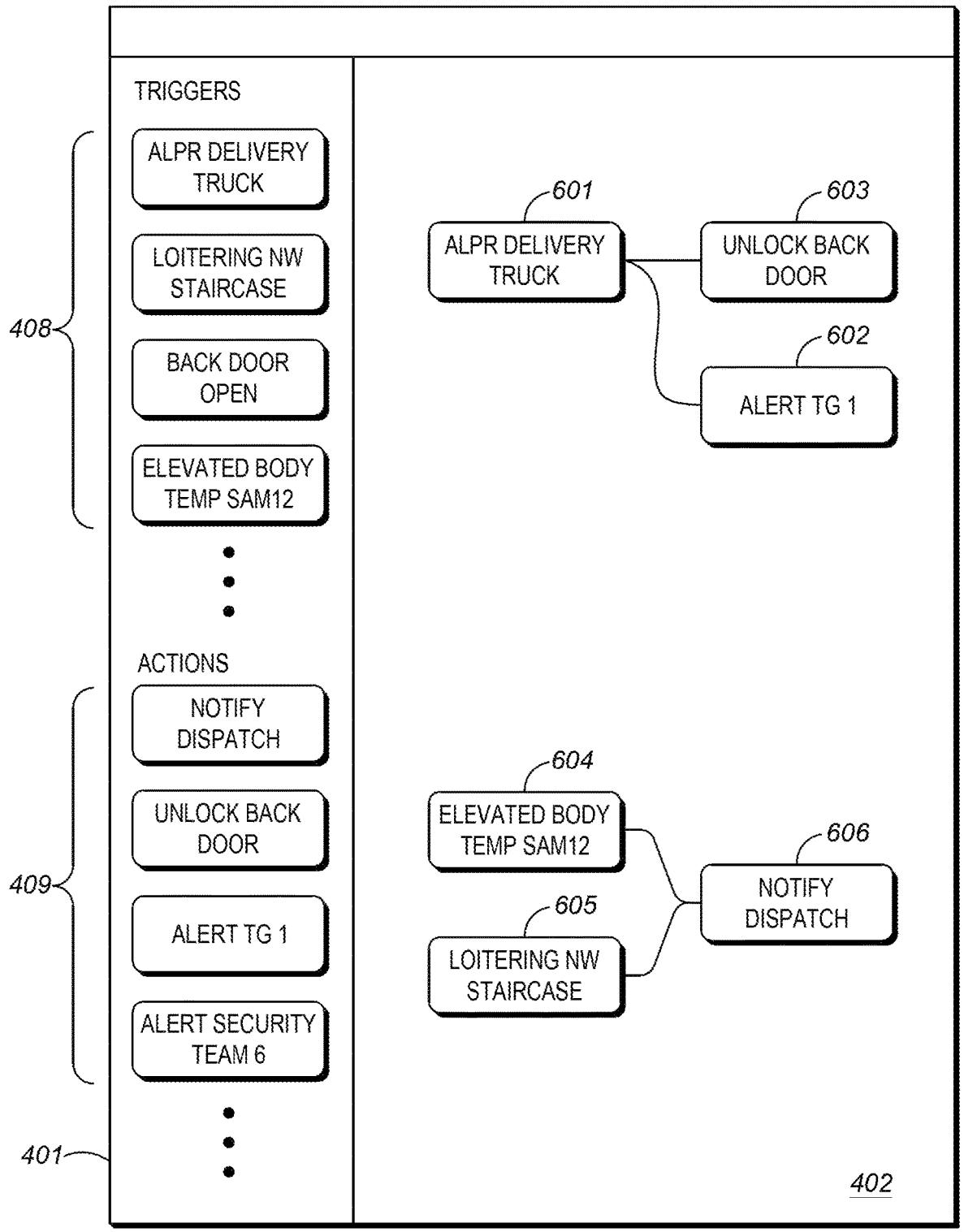
FIG. 6 illustrates the creation of a workflow.

As illustrated in FIG. 6, a single trigger may be associated with multiple actions. Thus, the trigger "ALPR delivery truck" 601 may be associated with action "unlock back door" 603 as well as associated with "alert TG 1" 602. When this workspace is uploaded to workflow server 102, the automatic license plate detected for the delivery truck will cause both the back door to unlock and an alert to be sent on talkgroup #1.

In a similar manner multiple triggers may be associated with a single action. Thus, both the triggers "elevated body tem SAM 12" 604 and "loitering NW staircase" will cause the action of "notify dispatch" 606. Thus, when officer SAM 12 has an elevated body temperature dispatch is notified, and when loitering is detected in the NW staircase, dispatch is notified.

As mentioned above, a problem arises in that a system administrator may become overwhelmed with potential triggers, actions, and associated parameters when setting up a workflow. The user may not initially understand which triggers should result in which actions, which actions should be caused by which triggers, or parameters associated with each workflow overall. Furthermore, in some cases, similar workflows may have been created by others. It would be beneficial to the system administrator to gain knowledge from workflows created by others, rather than for each system administrator to recreate work that has been done by others.

Figure 7:
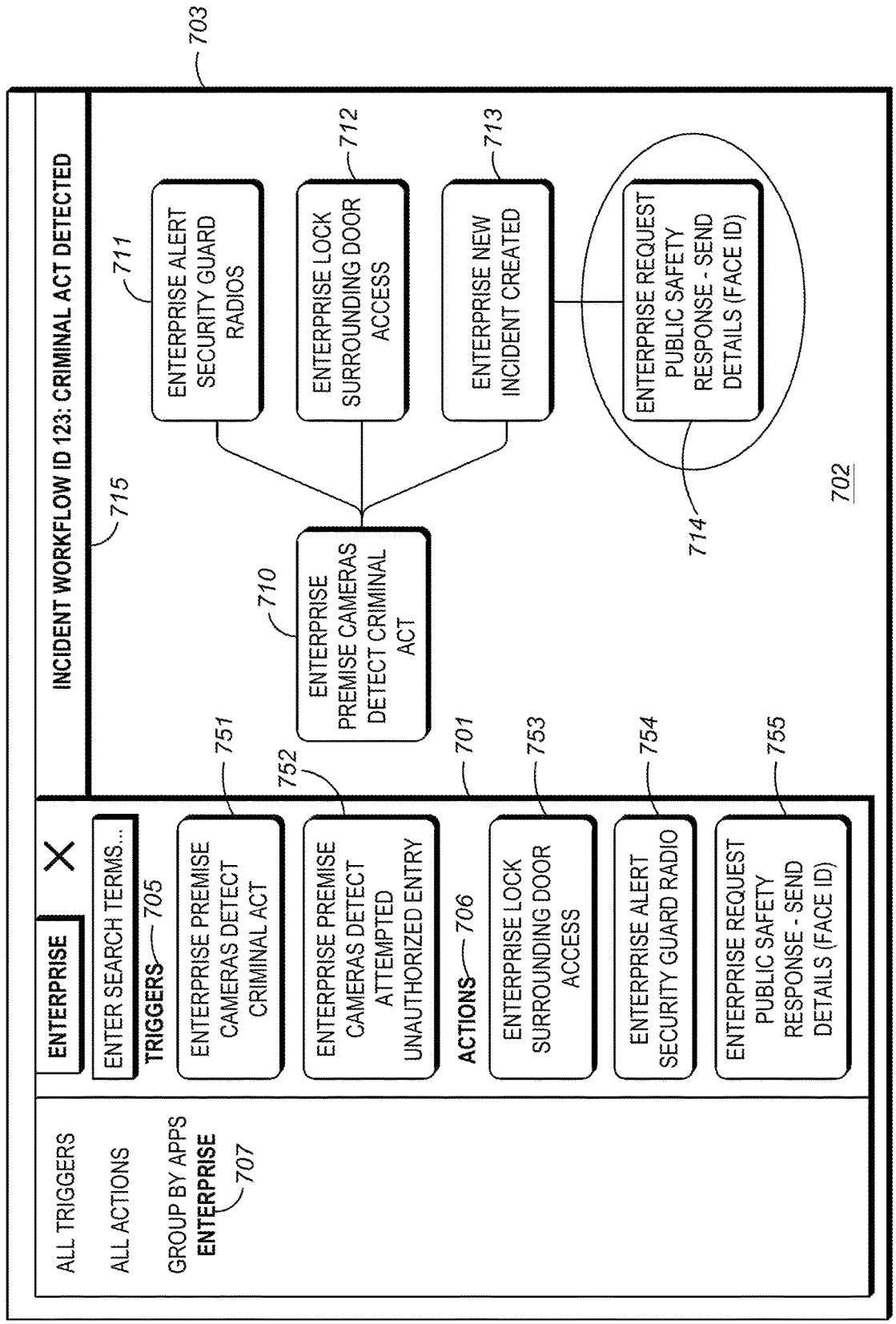
FIG. 7 is an example workflow that notifies an external entity.

FIG. 7 is an example workflow that notifies an external entity. Dashboard 703 is very similar to the dashboard 303 that was described above. Just as above, dashboard 703 may include a selection pane 701 that includes the available triggers 705 and actions 706. The dashboard 703 may also include the workspace 702 where the user may create and modify workflows. As explained above, workflows are created by dragging triggers and actions from the selection pane 701 onto the workspace 702. The actions and triggers may then be associated with each other by connecting the triggers and actions by utilizing the GUI provided by the dashboard.

In the dashboard example provided above, all triggers and actions were shown as being ungrouped in the selection pane. However, in an actual implementation, having large numbers of actions and triggers, which may all come from different systems (e.g. access control, surveillance, radio, public safety, etc.) may become quite confusing. In order to provide a better mechanism for organizing the actions and triggers, they may be grouped by App. For example, as shown in FIG. 7, there is listed a single App, the Enterprise 707. When this option is selected (or as in this case when it is the only option available) only actions and triggers associated with that app will be displayed. For purposes of this description, the Enterprise 707 will include actions and triggers associated with the systems under the enterprise's control (e.g. video surveillance system 140, radio system 150, access control system 160, etc.). Additional systems will be introduced with respect to FIG. 8.

Some example triggers are described with respect to FIG. 7. Some example triggers may be Premise cameras detect criminal act 751 and premise cameras detect attempted unauthorized entry 752. Some example actions may include lock surrounding access door 753, alert security guard radio 754, and request public safety response—send details (Face ID) 755. Modifications of these triggers and actions based on interaction with a public safety system is described in further detail below.

In the workspace 702, an example workflow is provided. In this example workflow, there is a trigger 710 that comes from the enterprise when the Premise cameras (e.g. from video surveillance system 140, etc.) detect a criminal act is occurring. For example, in a hotel, a criminal act may be a person attempting to break into a room. In a business, a criminal act may be a person attempting to steal an item. The specific trigger is relatively unimportant. What should be understood is that the trigger causes the workflow to be initiated.

In response to the trigger, there may be several actions taken in the example workflow. For example, action 711 may be to alert security guard radios (e.g. via radio system 150). This action is executed by the enterprise system.

Another example, action may be to lock surrounding door access 712. For example, this may be done to prevent the criminal suspect from escaping, by locking an egress routes. As yet another action, a new incident may be created to allow the enterprise to track this incident.

Thus far, all the actions described have been executed on systems that are under the control of the enterprise. In order to handle this particular workflow, help from an external entity may be required. In the present example, the external entity may be a public safety system (e.g. public safety network 130). The public safety network may include a police response, a fire department response, emergency medical services response, or any other such external response. Although the techniques described herein utilize a public safety response as the example of an external response, it should be understood that the response could be provided by any entity that is external to the enterprise. The techniques described herein will most often be used with a public safety external response, they are not so limited.

The action Request Public Safety Response—Send Details (Face ID) 714 may cause the workflow server to interface with a public safety system (e.g. public safety network 130) to request assistance. As part of the request, the workflow server may send certain details related to the incident to the public safety system. For example, when the workflow described with respect to FIG. 7 is initiated, a new incident is created 713. There may be an incident ID associated with this workflow (e.g. Incident Workflow ID 123 715). This created ID may be sent to the public safety system in order to link the enterprise incident ID with a public safety CAD ID.

Figure 8:
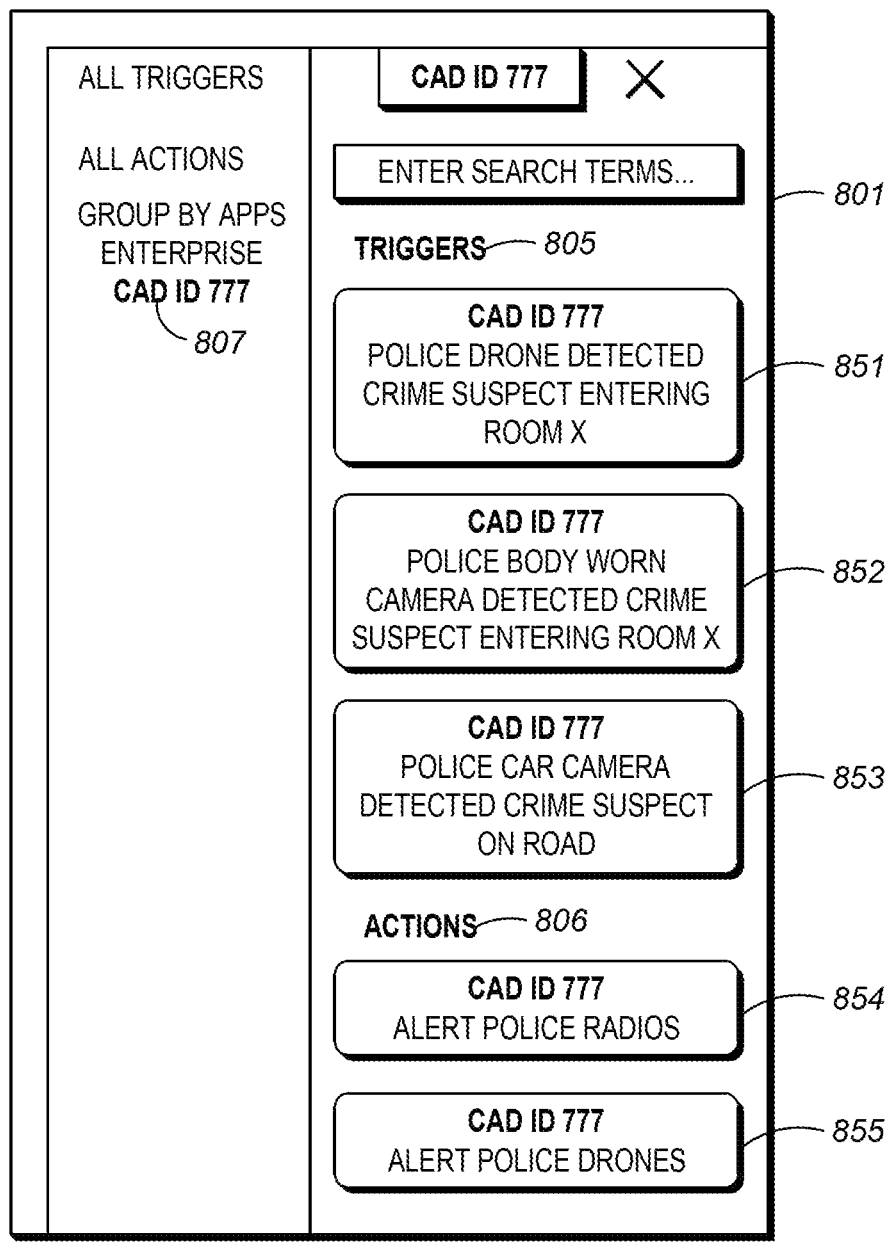
FIG. 8 is an example of capabilities such as triggers and actions provided by an external entity.

In addition to the incident workflow ID, other details related to the incident may be sent. In the present example, a criminal act was detected by a camera. Details of the incident could be a Face ID of the criminal suspect (e.g. to be used for facial recognition). Different incident types may send different details. For example, a fire incident may send the location of the fire and the type of material that is burning. A medical incident may include a location of the patient and the symptoms being experienced. Regardless of the type of incident, details related to the incident may be shared with the public safety system FIG. 8 is an example of capabilities such as triggers and actions provided by an external entity. FIG. 8 depicts a selection pane 801 that depicts triggers and actions that are provided by the public safety responders. As shown, the triggers 805 and actions 806 available may be filtered by App. In this case, CAD ID 777 807 will be the used to depict actions and triggers that can be triggered/executed by public safety responders.

In FIG. 7, after the workflow server sends a request to the public safety system for assistance, the public safety system may respond. The response may include information that can be utilized by the workflow server. As an initial matter, the public safety CAD system may return a CAD ID that is used within the CAD system to identify this particular response to the request for assistance. A new CAD ID will generally be created for each request for assistance, thus allowing the CAD system to keep track of what resources have been assigned to each response. In the present example, CAD ID 777 has been assigned to track the public safety response to the request for public safety assistance that was described with respect to FIG. 7.

In addition to the CAD ID, the public safety system may respond with triggers 805 and actions 806 that describe the capabilities of the public safety responders. For example, as shown the public safety system may dispatch several resources to the incident scene, including a drone, which is equipped with a camera, a police officer who may be wearing a body worn camera, and a police car that includes a camera (e.g. dashcam). Each of these cameras may include identification software (e.g. facial recognition software, etc.) that may allow the camera to identify a suspect. As mentioned above, when the request for assistance was sent from the workflow server to the public safety system, the identity of the suspect (e.g. Face ID) was part of the incident details sent to the public safety system. The various cameras described may then have been configured to detect the criminal suspect.

As shown, a trigger 851 may include Police Drone detected crime suspect entering room X. In other words, when a police drone camera detects that the crime suspect is attempting to enter room X, trigger 851 will be activated. Similarly, another trigger 852 may be police body worn camera detected that crime suspect entering room X. Yet another trigger 853 may be that the police car camera detected crime suspect on road. When any of these triggers occurs, any workflows that include these triggers may be initiated, as will be described in further detail below.

Although several example triggers are provided, it should be understood that this is for purposes of description only and not by way of limitation. What should be understood is that the public safety system may send triggers that are indicative of capabilities that are being provided as part of the public safety response. These triggers may identify specific capabilities of public safety responders that may not be available to the enterprise generally, absent the public safety response. What should also be understood is that these triggers cannot be known by the workflow server in advance, because the specific resources being dispatched by the public safety system to respond to an incident may not be known before the request for assistance is received. For example, consider the case where there may not be a drone available to be dispatched to assist in this particular incident. As such, the drone based trigger 851 would not be sent from the public safety system to the workflow server.

Just as triggers may be provided from the public safety system, actions 806 may also be provided. As above, the actions may be specific capabilities that are available to the public safety responders and would not necessarily be readily available to the enterprise workflow server. For example, action 854 may include alerting police radios. In general, the police radio system may be a private radio system with restricted access. The radio system 150 utilized by the enterprise would generally not be able to communicate using the police radio system. However, because the action 154 is provided to the workflow server, the workflow server may be granted permission to use the police radio system.

Likewise, the workflow server may be granted access to the resources provided by the public safety system. For example, action 855 may allow the workflow server to alert the police drone. Normally, access to the police drone would not be available to the general public. However, by providing this action to the workflow server, the CAD system is able to allow the enterprise to access the resource, at least for purposes of processing the specific in progress incident. As mentioned above, in some cases, the enterprise system may have superior resources. For example, the enterprise security camera system may provide better coverage than the cameras brought by the public safety responders. If the enterprise camera system is able to spot the criminal suspect, the action 855 may be triggered to allow the workflow server to send the suspect current location information to the drone using action 855.

Once acing, the specific actions 806 sent from the CAD system described in FIG. 8 are examples only to aid in understanding, and are in no way intended to be limiting. What should be understood is that actions are sent from the CAD system to the workflow server to be integrated into workflows. Just as above with respect to triggers, the specific actions that will be available are incident specific, and dependent on the particular resources being dispatched to handle this incident. Typically, the actions are things that would generally not be directly available to the workflow server, absent the actions being sent by the CAD system to the workflow server What should also be understood is that the triggers 805 and actions 806 sent from the CAD system to the workflow server are not intended to be permanent additions to the actions and triggers available to the workflow server. Instead, these actions and triggers are only intended to last for the lifetime of the incident. Once the incident has concluded (e.g. suspect in custody, fire extinguished, etc.) it is expected that any actions and triggers sent from the CAD system to the workflow server would be removed. Upon the next incident occurring, the triggers and actions associated with the response for that particular incident may once again be sent from the CAD system to the workflow server. Because the responses are incident specific, it is entirely possible that two similar incidents would receive completely different sets of actions and triggers for the response, based on the specific resources being dispatched for that specific response.

Figure 9:
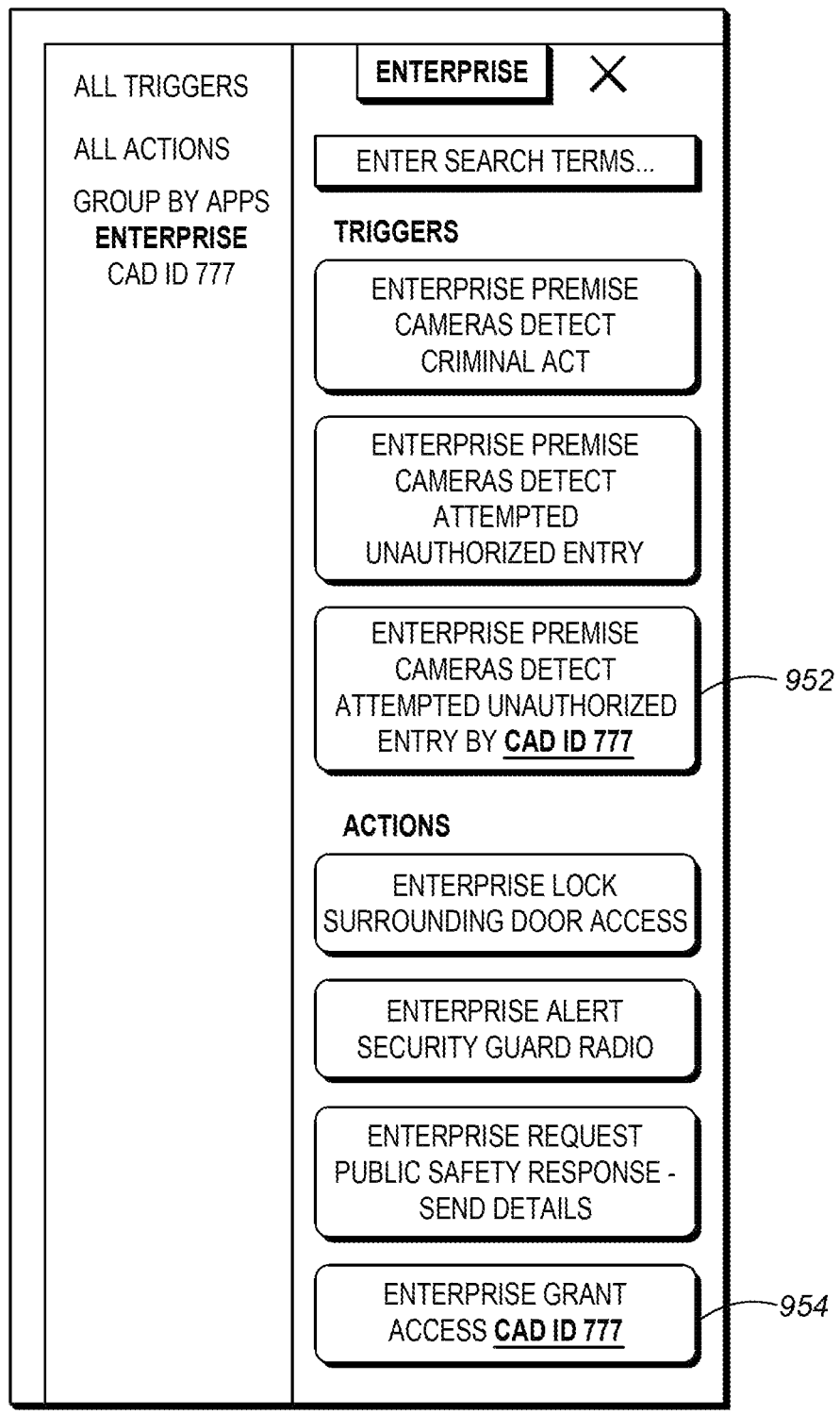
FIG. 9 is an example of integrating an external entity response into existing triggers and actions.

FIG. 9 is an example of integrating an external entity response into existing triggers and actions. As described with respect to FIG. 7, the workflow server may have a set of existing triggers and actions. However, when a response is requested from a public safety system, the list of available actions may be supplemented with actions that are specifically geared toward the public safety response.

For example, a trigger 752 may have been premise cameras detect attempted unauthorized entry. For example, this trigger may occur when a criminal suspect is attempting to gain access to an area where he is not authorized to have access. This may trigger an action to cause enterprise security guards to respond.

However, when there is a public safety response, the responders will generally need to access areas that they might not normally be granted access to. For example, in a hotel, a suspect may have barricade himself into a room. Normally, a civilian attempt to access that room (e.g. break the door down, etc.) might be considered an unauthorized access attempt. In the case where a public safety officer is attempting to enter the room in order to handle the incident, the entry attempt should actually be allowed, as it is just the public safety officer responding to the incident.

A new trigger 952 may be included that is a slight modification of trigger 752. The premise camera may still detect the attempted unauthorized entry attempt trigger, but it is modified to include that the entry is by someone associated with the public safety incident response CAD ID 777. In other words, the person attempting the unauthorized access is a public safety responder, and the response may actually be legitimate. As will be explained in further detail below, the response action may be different when the person that caused the trigger is associated with the public safety response. For example, instead of alerting the security guard radios, the action may be that the access control system 160 causes the door to the restricted area to unlock.

For example, as shown in the actions section of FIG. 9, a new action 954 may be to grant access to CAD ID 777, or more particularly to a responder associated with CAD ID 777 response. The action may in essence provide the first responder to access to anywhere he needs to go in order to properly respond to the incident.

It should be noted that when the CAD system responds to the workflow server to provide triggers and actions that will now be available to the workflow server, the CAD system may also respond with details about the specific responders. For example, the CAD system may identify the particular responders that will be responding to the incident (e.g. include Face ID of each responder). The enterprise camera system would then be able to use this identifier to determine if a person is associated with the public safety response or is just a normal individual. Although using a specific identifier such as a Face ID would be secure, in some cases, the public safety responders may be identified by non-personally identifiable information (e.g. presence of a uniform, presence of a badge, arrival in a public safety vehicle, etc.). What should be understood is that the CAD system provides to the workflow server information about the response that is sufficient for the workflow server to be able to distinguish between those persons who are associated with the public safety response (e.g. responders) and others persons, who just happen to be located at the enterprise.

Figure 10:
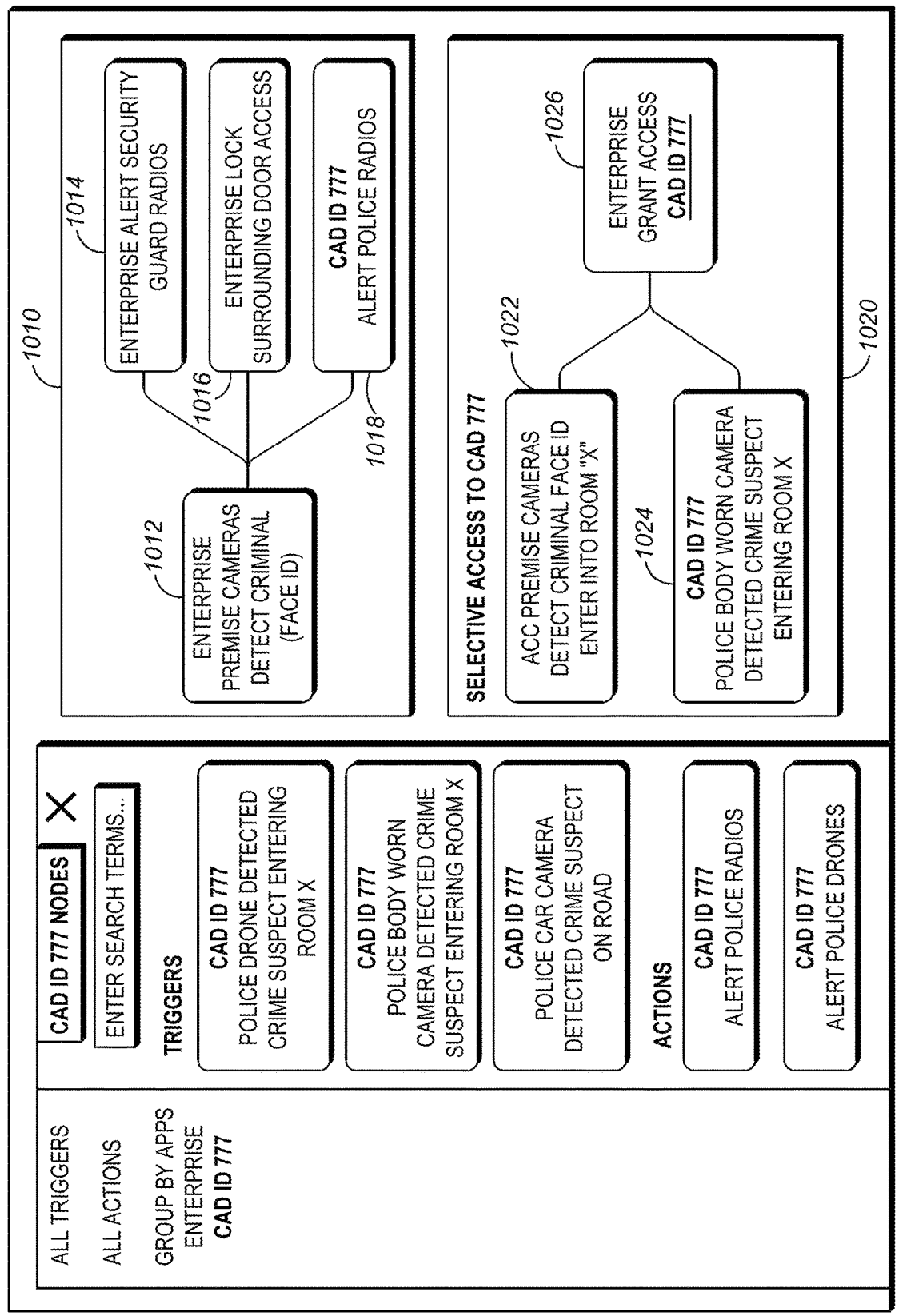
FIG. 10 is an example workflow with integration of the enterprise and external entity triggers and actions.

FIG. 10 is an example workflow with integration of the enterprise and external entity triggers and actions. FIG. 10 depicts several workflows, after they have been modified to include the triggers and/or actions that were provided by the CAD system related to resources that had been dispatched to respond to the request for assistance from the workflow server. As explained above, the public safety system may have capabilities that the workflow server would now know about until the request for assistance has been sent to the CAD system. The particular capabilities would also not be known until it is determined which resources would be sent to handle the request for assistance.

Workflow 1010 may generally mirror the workflow described in FIG. 7. In workflow 1010, the initial trigger may be that the enterprise premise cameras detect a criminal (face ID) 1012. For example, a previous request for assistance may have been received by the public safety CAD system, and resources, such as first responders (e.g. law enforcement officers, etc.) may have been dispatched. While the public safety response is in progress, the enterprise system may still detect new triggers. For example, in this case, the enterprise system may have detected that a criminal has been detected based on the detection of the criminals Face ID.

The trigger 1012 may cause several actions to be initiated. First, the security guard radios may be alerted 1014. As explained above, the enterprise private radio system 150 may be accessible by the workflow server. The detection of the criminal's face on an enterprise camera may be conveyed to the enterprise security guards to potentially go to the location where the criminal was detected, and attempt to apprehend the criminal.

As yet another action, the enterprise may lock surrounding door access 1016. For example, this may be done utilizing the enterprise access control system 160. Once again, the enterprise access control system be fully under control of the enterprise, and as such is accessible from the workflow server. Locking surrounding door access may prevent the criminal from leaving the area, or entering a new area where the criminal suspect is not allowed to be.

A third action that may be executed is to alert police radios 1018. As explained above, the police radio system may be a private radio system that is accessible to public safety personnel only. As such, there would, absent an in progress response from public safety, be no way for the workflow server to access the public safety radio system. However, with the techniques described herein, this action may have been provided by the CAD system when responding to the request for assistance from the workflow server. As described with respect to FIG. 8, capabilities of the public safety system (e.g. actions, etc.) may be exposed, at least temporarily, to the workflow server. The workflow server may the modify workflows to include actions that are now available from the public safety response.

In addition to modifying workflows to take into account new actions that are available based on the public safety response, the workflows can also be modified to include new triggers that are available based on the public safety response. For example, workflow 1020 may have initially included trigger 1022, wherein the enterprise premise cameras detect criminal face ID enter into room "X". In other words, the enterprise cameras detect that the criminal is entering a particular area. A new trigger may come from the public safety response. For example, a police officer may have been dispatched to respond to the request for assistance from the enterprise workflow server.

The police officer that was dispatched may be wearing a body worn camera, and a new trigger may be that the police body worn camera detects the crime suspect entering room X 1024. So, in other words, either the enterprise camera or the police body worn camera may have detected that the criminal suspect has entered room X.

In response, the workflow server, using the access control system 160 may initiate an action 1026 to grant access to responders associated with CAD ID 777. The area that access is being granted to may be an area that the responding officer may not normally have been granted access to.

Although not show, it should be further understood that the workflows may be modified such that the public safety responder is only granted access to areas that are necessary for the public safety responder to address the ongoing incident. For example, the above example describes that the system has detected the presence of the criminal suspect in room X as the trigger to grant the public safety responder access to room X. The reason for this is that the incident is related to the criminal suspect. However, the public safety responder may not be given access to a different area (e.g. room Y, etc.) if there is not an incident related reason as to why the public safety responder needs access to that area. By only granting the public safety responder access to areas that areas that are necessary to respond to the incident, the enterprise is able to protect its privacy interests by keeping the areas accessed by public safety responders to the minimum necessary to respond to the incident.

The areas of access and the amount of information shared with the public safety responder may change as the situation evolves. For example, assume that the criminal suspect climbs out the window of room X and enters into room Y, and this movement is detected by the police drone. The workflow server may then grant access to room Y to the public safety responder. In addition, assume this enterprise is a hotel, and that room Y is a room occupied by other hotel guests. Information related to those guests (e.g. passport photos, contact information, etc.) could then be shared with the public safety responder (e.g. so the responder recognizes who is supposed to be in the room, etc.). This is the type of information that would normally not be shared with the first responder in order to protect guest privacy. However, in this case, the response to the incident requires that this information be shared in the least privacy impacting manner possible. For example, only the identities of the guests in room Y are shared, not the identities of every guest in the hotel.

In order to further protect the enterprise in cases of a public safety response, workflows may be modified to prevent access to enterprise personnel that would normally be granted access. For example, in the case where the criminal suspect has entered a certain area, access to that area by other people may be denied, to limit exposure to the criminal suspect. Continuing with the above example, if the criminal suspect has entered room Y, which is a hotel room occupied by other guests, the access to room Y by those guests may be temporarily denied. In this way, it is possible to ensure that the hotel guests do not accidently enter the room with the criminal suspect present.

Another benefit of modifying the workflows in accordance with public safety responses is to help protect the enterprise interests. For example, assume that the criminal suspect has entered room X, and locked the door. The public safety response may normally be to attempt to break down the door to apprehend the criminal suspect. However, this may cause damage to the enterprise property (e.g. the broken down door, etc.). By granting access to the public safety responder, damage to enterprise property can be avoided, while at the same time restricting the amount of access the public safety officer is granted.

Figure 11:
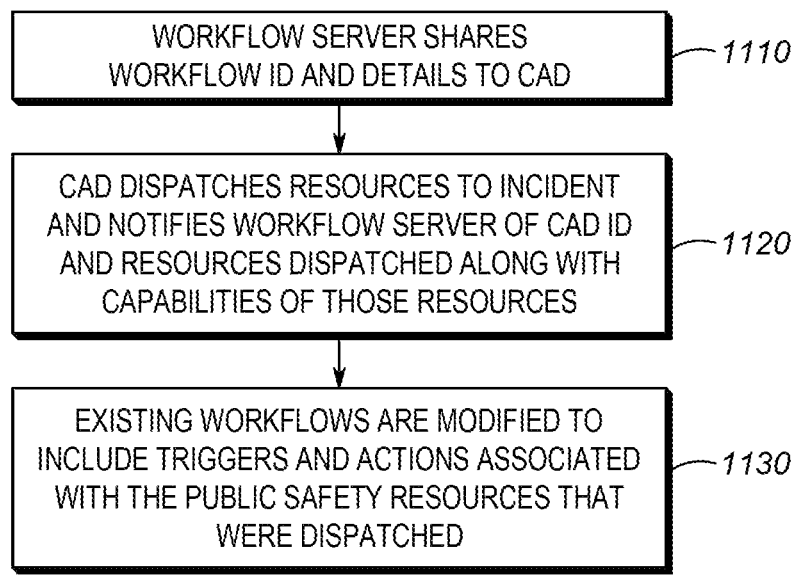
FIG. 11 is an example of a high level flow diagram for integrating capabilities of an external entity.

FIG. 11 is an example of a high level flow diagram 1100 for integrating capabilities of an external entity. In block 1110, a workflow server shares workflow ID and details to the CAD system. As described above, when a request for assistance from an external public safety agency is sent, the workflow server may send details of the incident to the CAD system. Those details may include the workflow ID of the workflow that has been initiated within the enterprise workflow server. The details can also include incident related details. For example, in the case of a criminal suspect, the Face ID of the suspect may be shared. Incident details may be highly specific to the type of incident that assistance is being requested for. What should be understood is that the details may include information that the public safety responders may find useful in responding to the incident.

In block 1120, CAD dispatches resources to the incident and notifies workflow server of CAD ID and resources dispatched along with capabilities of those resources. As explained above, the public safety response may include the availability of new and/or different triggers and actions that the workflow server may not have previously been aware of. In many cases, these triggers and actions may be public safety specific and are dependent on the exact resources that are being dispatched. Because the actions and triggers are dependent on the dispatched resources, it is not possible for the workflow server to be aware of those actions and triggers until the resources are actually dispatched.

In block 1130, existing workflows are modified to include triggers and actions associated with the public safety resources that were dispatched. Existing workflow may be modified to take into account the new capabilities that are provided by the public safety responders. The workflows are also modified such that other interests of the enterprise (e.g. privacy, premise damage, etc.) are taken into account while still allowing the public safety responders sufficient privileges to respond to the incident.

Figure 12:
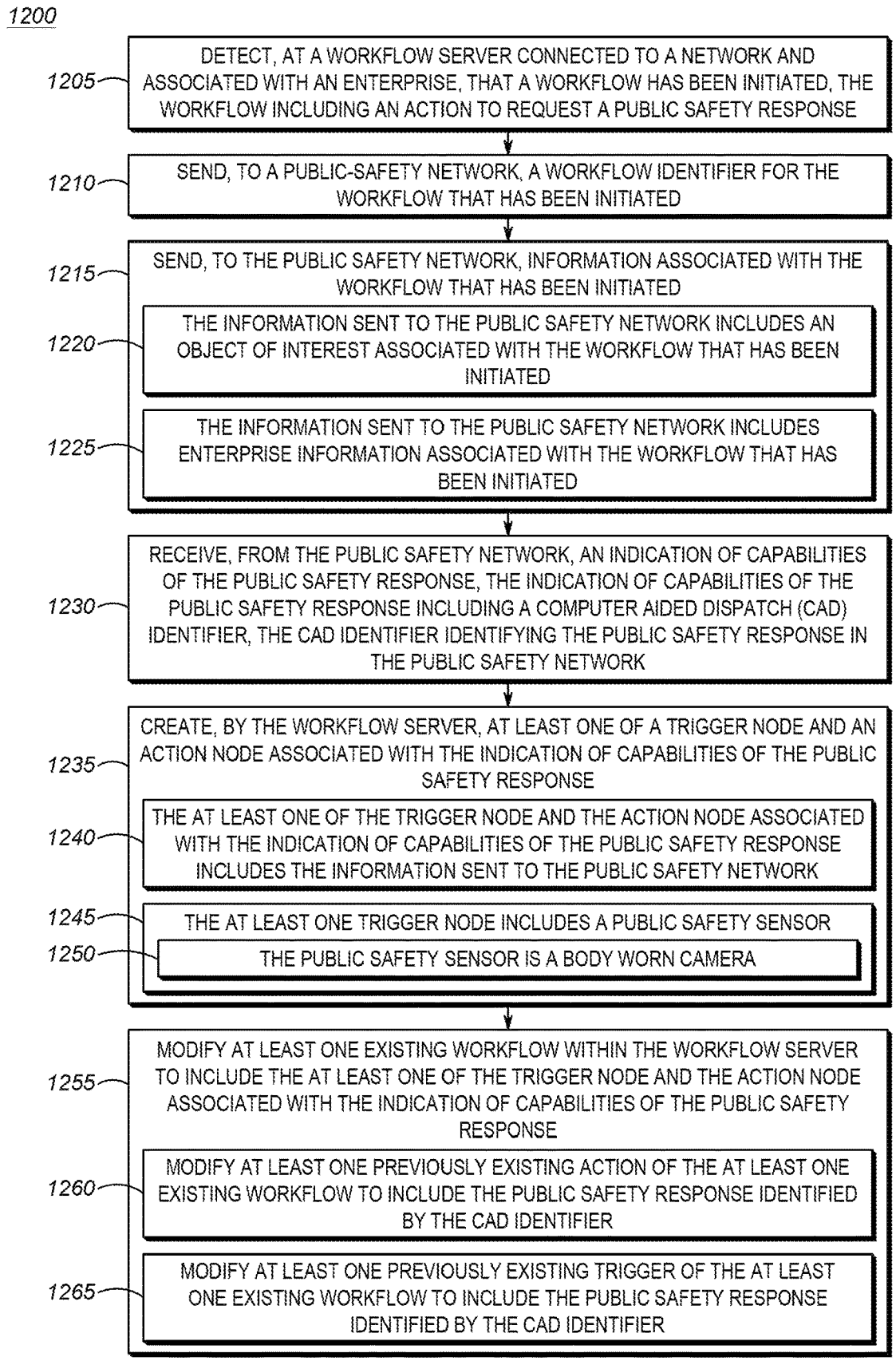
FIG. 12 is an example, of a flow diagram that implements the converged incident management workflows between private and public safety techniques described herein.

FIG. 12 is an example, of a flow diagram 1200 that implements the converged incident management workflows between private and public safety techniques described herein. In block 1205, a workflow server connected to a network and associated with an enterprise detects that a workflow has been initiated. The workflow including an action to request a public safety response. As described above, a trigger may cause a workflow to be initiated. In some cases, the workflow may include an action in which assistance is requested from an external entity, such as a public safety agency. For example, the request may be in the form of making a call to 911 or to otherwise request assistance from a public safety agency. The public safety agency may be able to provide resources and capabilities that are not available to the enterprise (e.g. armed response, specialized restricted equipment, etc.).

In block 1210, a workflow identifier for the workflow that has been initiated may be sent to the public safety network. Each workflow that is initiated in the workflow server may be associated with a workflow identifier that is used to indicate the particular execution of the workflow. Each time a workflow is initiated a separate identifier may be created. By creating a workflow identifier for each workflow initiation, the workflow server can keep track of each execution of the workflow, and associate information to that particular execution of the workflow.

In block 1215, information associated with the workflow that has been initiated may be sent to the public safety network. For example, in the case of a criminal suspect, and identifier of the suspect, such as a Face ID may be sent to the public safety network. In the case of a fire, the location of the fire may be sent to the public safety network. What should be understood is that details associated with the incident that may be helpful to public safety personnel responding to the incident may be provided. For example, the details may include information that would typically be provided to a 911 call taker or included in an electronic communication requesting assistance. At minimum, the details may include the type of incident for which assistance is being requested.

In block 1220, the information sent to the public safety network includes an object of interest associated with the workflow that has been initiated. For example, the object of interest may be a person (e.g. criminal suspect, etc.) that caused the workflow to be initiated. The object of interest may be an inanimate object. For example, in the case of a vehicular hit and run incident, the object of interest may be a vehicle and the information may be related to the description (e.g. color, license plate number, etc.) of the vehicle. What should be understood is that information related to objects associated with the incident for which assistance is being requested is sent to the public safety network.

In block 1225, the information sent to the public safety network includes enterprise information associated with the workflow that has been initiated. Information related to the enterprise may include information about the enterprise that would assist in a public safety response. For example, in the case of a fire, enterprise information could include the location of the fire, the best entrance to gain quickest access to the fire, etc. What should be understood is that enterprise information that is not necessarily associated with a specific object of interest and is enterprise related may be sent to the public safety network.

In block 1230, an indication of capabilities of the public safety response may be received from the public safety network. The indication of capabilities of the public safety response may include a computer aided dispatch (CAD) identifier. The CAD identifier may identify the public safety response in the public safety network. When the public safety system dispatches responders to address the request for assistance, those responders may have certain capabilities. The specific capabilities are dependent on the actual responders assigned to provide assistance. The workflow server may not initially be aware of those capabilities. Furthermore, just as with the workflow identifier, each response to a request for assistance may be associated with an identifier in the CAD system. The CAD system may use this identifier to keep track of which resources have been dispatched in order to respond to the request for assistance.

In block 1235, the workflow server may create at least one of a trigger node and an action node associated with the indication of capabilities of the public safety response. As explained above, the public safety response may include triggers and actions that will be available to be utilized in a specific response to the request for assistance from public safety responders. As explained above, these triggers and actions may be used to modify existing workflows to take into account capabilities of the public safety personnel that are providing the requested assistance.

In block 1240, the at least one of the trigger node and the action node associated with the indication of capabilities of the public safety response includes the information sent to the public safety network. For example, the information sent to the public safety system may include objects of interest or enterprise information. This information may then be included in the triggers or actions provided by the public safety response system. For example, if the information provided included a Face ID of a suspect object of interest, actions and triggers provided by the public safety system could include what action is executed and/or trigger is initiated based on detection of that Face ID.

In block 1245, the at least one trigger node includes a public safety sensor. For example, the public safety response may include one or more sensors that may be particularly associated with a public safety response. This may be sensors that are generally not available to the enterprise. Such sensor may include sensors such as drones, specialized weapons, access to private radio networks, or in general sensors that may not be available to an enterprise. In block 1250, the public safety sensor may be a body worn camera.

In block 1255, at least one existing workflow may be modified within the workflow server to include the at least one of the trigger node and the action node associated with the indication of capabilities of the public safety response. As explained above, the workflow server may not initially be aware of the capabilities of the public safety response until that response has been initiated. Once the response has been initiated and the capabilities of the public safety responders have been sent to the workflow server in the form of new triggers and actions, those new triggers and actions may be incorporated into existing workflows, or in some cases form the basis of creation of new workflows.

In block 1260, at least one previously existing action of the at least one existing workflow may be modified to include the public safety response identified by the CAD identifier. As described above, an action may be modified to include a specific capability provided by the public safety responder. For example, the action of notifying a police drone in accordance with a specific CAD ID is a modification based on the CAD identifier (e.g. the drone is dispatched as part of the response).

In block 1265, at least one previously existing trigger of the at least one existing workflow to include the public safety response identified by the CAD identifier. For example, a trigger may be detection of an object of interest in a camera. In the case of a public safety response, a trigger may be identification of the object of interest with a camera that is included in the response being provided by public safety responders.

Figure 13:
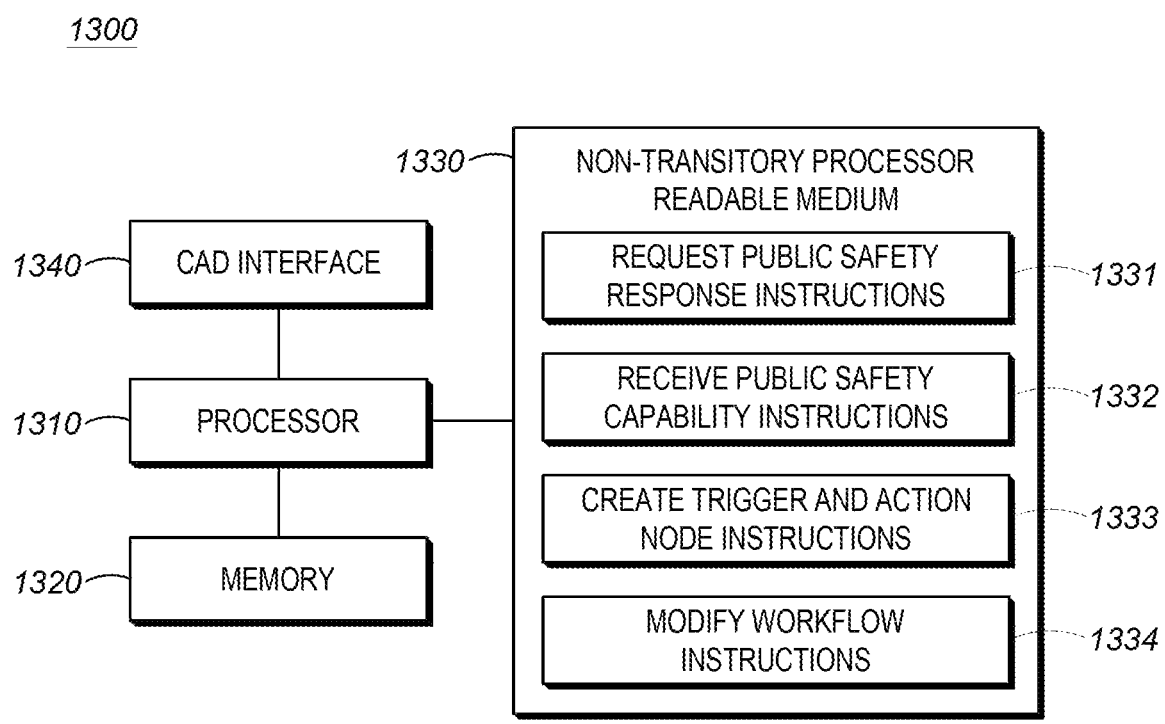
FIG. 13 is an example of a device that may implement the techniques described herein.

FIG. 13 is an example of a device 1300 that may implement the techniques described herein. For example device 1300 may implement the converged incident management workflows between private and public safety techniques described herein. It should be understood that device 1300 represents one example implementation of a computing device that utilizes the techniques described herein. Although only a single processor is shown, it would be readily understood that a person of skill in the art would recognize that distributed implementations are also possible. For example, the various pieces of functionality described above (e.g. workflow modification, etc.) could be implemented on multiple devices that are communicatively coupled. FIG. 13 is not intended to imply that all the functionality described above must be implemented on a single device.

Device 1300 may include processor 1310, memory 1320, non-transitory processor readable medium 1330, and CAD interface 1340.

Processor 1310 may be coupled to memory 1320. Memory 1320 may store a set of instructions that when executed by processor 1310 cause processor 1310 to implement the techniques described herein. Processor 1310 may cause memory 1320 to load a set of processor executable instructions from non-transitory processor readable medium 1330. Non-transitory processor readable medium 1330 may contain a set of instructions thereon that when executed by processor 1310 cause the processor to implement the various techniques described herein.

For example, medium 1330 may include request public safety response instructions 1331. The request public safety response instructions 1331 may cause the processor to determine that a workflow has been initiated and that a response from a public safety agency is to be requested, along with sending details to the public safety agency. For example, the request may be sent and received using CAD interface 1340. The request public safety response instructions 1331 are described throughout this description generally, including places such as the description of blocks 1205-1225.

The medium 1330 may include receive public safety capabilities instructions 1332. The receive public safety capabilities instructions 1332 may cause the processor to receive actions and triggers available from the public safety CAD system via CAD interface 1340. The receive public safety capabilities instructions 1332 are described throughout this description generally, including places such as the description of block 1230.

The medium 1330 may include create trigger and action node instructions 1333. The create trigger and action node instructions 1333 may cause the processor to create new trigger and action nodes based on the capabilities reporter by the CAD system via the CAD interface 1340. The create trigger and action node instructions 1333 are described throughout this description generally, including places such as the description of blocks 1235-1250.

The medium 1330 may include modify workflow instructions 1334. The modify workflow instructions 1334 may cause the processor to incorporate the triggers and actions received from the CAD system into existing workflows. The modify workflow instructions 1334 are described throughout this description generally, including places such as the description of blocks 1255-1265.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   detecting, at a workflow server connected to a network and associated with an enterprise, that a workflow has been initiated, the workflow including an action to request a public safety response;
   sending, to a public-safety network, a workflow identifier for the workflow that has been initiated;
   sending, to the public safety network, information associated with the workflow that has been initiated;
   receiving, from the public safety network, an indication of capabilities of the public safety response, the indication of capabilities of the public safety response including a computer aided dispatch (CAD) identifier, the CAD identifier identifying the public safety response in the public safety network;
   creating, by the workflow server, at least one of a trigger node and an action node associated with the indication of capabilities of the public safety response, wherein at least one trigger node and action node are only displayed when an option to display triggers and actions not under the control of the enterprise is selected; and
   modifying at least one existing workflow within the workflow server to include the at least one of the trigger node and the action node associated with the indication of capabilities of the public safety response.

2. The method of claim 1 further comprising:
modifying at least one previously existing action of the at least one existing workflow to include the public safety response identified by the CAD identifier.

3. The method of claim 1 further comprising:
modifying at least one previously existing trigger of the at least one existing workflow to include the public safety response identified by the CAD identifier.

4. The method of claim 1 wherein the at least one of the trigger node and the action node associated with the indication of capabilities of the public safety response includes the information sent to the public safety network.

5. The method of claim 4 wherein the information sent to the public safety network includes an object of interest associated with the workflow that has been initiated.

6. The method of claim 4 wherein the information sent to the public safety network includes enterprise information associated with the workflow that has been initiated.

7. The method of claim 1 wherein the at least one trigger node includes a public safety sensor.

8. The method of claim 7 wherein the public safety sensor is a body worn camera.

9. A system comprising:
a processor; and
a memory coupled to the processor, the memory containing a set of instructions thereon that when executed by the processor cause the processor to:
detect, at a workflow server connected to a network and associated with an enterprise, that a workflow has been initiated, the workflow including an action to request a public safety response;
send, to a public-safety network, a workflow identifier for the workflow that has been initiated;
send, to the public safety network, information associated with the workflow that has been initiated;
receive, from the public safety network, an indication of capabilities of the public safety response, the indication of capabilities of the public safety response including a computer aided dispatch (CAD) identifier, the CAD identifier identifying the public safety response in the public safety network;
create, by the workflow server, at least one of a trigger node and an action node associated with the indication of capabilities of the public safety response, wherein at least one trigger node and action node are only displayed when an option to display triggers and actions not under the control of the enterprise is selected; and
modify at least one existing workflow within the workflow server to include the at least one of the trigger node and the action node associated with the indication of capabilities of the public safety response.

10. The system of claim 9 further comprising instructions to:
modify at least one previously existing action of the at least one existing workflow to include the public safety response identified by the CAD identifier.

11. The system of claim 9 further comprising instructions to:
modify at least one previously existing trigger of the at least one existing workflow to include the public safety response identified by the CAD identifier.

12. The system of claim 9 wherein the at least one of the trigger node and the action node associated with the indication of capabilities of the public safety response includes the information sent to the public safety network.

13. The system of claim 12 wherein the information sent to the public safety network includes an object of interest associated with the workflow that has been initiated.

14. The system of claim 12 wherein the information sent to the public safety network includes enterprise information associated with the workflow that has been initiated.

15. A non-transitory processor readable medium containing a set of instructions thereon that when executed by a processor cause the processor to:
detect, at a workflow server connected to a network and associated with an enterprise, that a workflow has been initiated, the workflow including an action to request a public safety response;
send, to a public-safety network, a workflow identifier for the workflow that has been initiated;
send, to the public safety network, information associated with the workflow that has been initiated;
receive, from the public safety network, an indication of capabilities of the public safety response, the indication of capabilities of the public safety response including a computer aided dispatch (CAD) identifier, the CAD identifier identifying the public safety response in the public safety network;
create, by the workflow server, at least one of a trigger node and an action node associated with the indication of capabilities of the public safety response, wherein at least one trigger node and action node are only displayed when an option to display triggers and actions not under the control of the enterprise is selected; and
modify at least one existing workflow within the workflow server to include the at least one of the trigger node and the action node associated with the indication of capabilities of the public safety response.

16. The medium claim 15 further comprising instructions to:
modify at least one previously existing action of the at least one existing workflow to include the public safety response identified by the CAD identifier.

17. The medium of claim 15 further comprising instructions to:
modify at least one previously existing trigger of the at least one existing workflow to include the public safety response identified by the CAD identifier.

18. The medium of claim 15 wherein the at least one of the trigger node and the action node associated with the indication of capabilities of the public safety response includes the information sent to the public safety network.

19. The medium of claim 18 wherein the information sent to the public safety network includes an object of interest associated with the workflow that has been initiated.

20. The medium of claim 18 wherein the information sent to the public safety network includes enterprise information associated with the workflow that has been initiated.

\* \* \* \* \*